United States Patent
Nie et al.

(10) Patent No.: US 12,277,936 B1
(45) Date of Patent: Apr. 15, 2025

(54) INTELLIGENT MANAGEMENT SYSTEMS FOR DIGITAL PERSON DIALOGUE BASED ON INTERNET OF THINGS

(71) Applicant: BEIJING ENGINING MEDICAL TECHNOLOGY CO., LTD., Beijing (CN)

(72) Inventors: William Nie, Rochester, NY (US); Steve Nie, Shanghai (CN)

(73) Assignee: BEIJING ENGINING MEDICAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/919,419

(22) Filed: Oct. 17, 2024

(30) Foreign Application Priority Data

Jan. 9, 2024 (CN) .......................... 202410030111.0

(51) Int. Cl.
*G10L 15/22* (2006.01)
*G10L 15/00* (2013.01)
*G10L 15/183* (2013.01)

(52) U.S. Cl.
CPC ............ *G10L 15/22* (2013.01); *G10L 15/005* (2013.01); *G10L 15/183* (2013.01); *G10L 2015/223* (2013.01)

(58) Field of Classification Search
None
See application file for complete search history.

(56) References Cited

U.S. PATENT DOCUMENTS

| 10,878,835 | B1* | 12/2020 | Pedruzzi | .............. G10L 15/02 |
| 2002/0128838 | A1* | 9/2002 | Veprek | .............. G10L 21/0364 |
| | | | | 704/E21.009 |

(Continued)

FOREIGN PATENT DOCUMENTS

| CN | 111414462 A | 7/2020 |
| CN | 111602154 A | 8/2020 |

(Continued)

OTHER PUBLICATIONS

First Office Action in Chinese Application No. 202410030111.0 mailed on May 9, 2024, 14 pages.

(Continued)

*Primary Examiner* — Jonathan C Kim
(74) *Attorney, Agent, or Firm* — Porus IP LLC

(57) ABSTRACT

Disclosed is an intelligent management system for a digital person dialogue based on Internet of Things. The system comprises a voice request question extraction module, configured to extract a voice request question input by a user and an input time point; a demand response time parsing module, configured to analyze a request urgency coefficient and a demand response time of the user; an adaptive response content search and determination module, configured to search and determine an adaptive response content; a dialogue scene recognition module, configured to recognize a dialogue scene; an adaptive dialogue intonation selection module, configured to select an adaptive dialogue intonation based on the dialogue scene; an adaptive dialogue language selection module, configured to determine an adaptive dialogue voice type; and a dialogue expression and implementation module, configured to perform a dialogue expression based on a dialogue platform.

5 Claims, 5 Drawing Sheets

(56) References Cited

U.S. PATENT DOCUMENTS

| | | | | |
|---|---|---|---|---|
| 2006/0271371 A1* | 11/2006 | Tsuboi | ............... | G10L 13/10 |
| | | | | 704/277 |
| 2007/0094029 A1* | 4/2007 | Saito | ............... | G10L 13/033 |
| | | | | 704/260 |
| 2011/0172989 A1* | 7/2011 | Moraes | ............. | G06Q 30/0251 |
| | | | | 704/260 |
| 2012/0053937 A1* | 3/2012 | Cao | ............... | G10L 15/26 |
| | | | | 704/235 |
| 2016/0163332 A1* | 6/2016 | Un | ............... | G10L 25/63 |
| | | | | 704/260 |
| 2016/0210985 A1* | 7/2016 | Deleeuw | ............. | G06F 40/40 |
| 2017/0083281 A1* | 3/2017 | Shin | ............... | G06F 3/165 |
| 2017/0223189 A1 | 8/2017 | Meredith et al. | | |
| 2018/0032884 A1* | 2/2018 | Murugeshan | ........... | G06F 40/35 |
| 2018/0114521 A1* | 4/2018 | Hwang | ............... | G10L 25/84 |
| 2018/0366104 A1* | 12/2018 | Qian | ............... | G06F 3/167 |
| 2019/0304450 A1* | 10/2019 | Kwon | ............... | G10L 15/26 |
| 2019/0318758 A1* | 10/2019 | Ma | ............... | G10L 21/04 |
| 2019/0354630 A1* | 11/2019 | Guo | ............... | G10L 15/08 |
| 2019/0394289 A1* | 12/2019 | Lehrian | ............... | H04L 67/306 |
| 2020/0004786 A1* | 1/2020 | Wang | ............... | G06F 40/289 |
| 2020/0090648 A1* | 3/2020 | Wambugu | ............. | G10L 25/48 |
| 2020/0186482 A1* | 6/2020 | Johnson, III | ........ | H04L 12/1818 |
| 2020/0193264 A1* | 6/2020 | Zavesky | ............... | G06N 20/00 |
| 2020/0272407 A1* | 8/2020 | Saito | ............... | G06N 5/04 |
| 2020/0302913 A1* | 9/2020 | Marcinkiewicz | ....... | G10L 15/02 |
| 2020/0311208 A1* | 10/2020 | Koohmarey | ........... | G06N 3/004 |
| 2020/0312352 A1* | 10/2020 | Kamiyama | ............. | G10L 15/02 |
| 2021/0049996 A1* | 2/2021 | Chae | ............... | G06N 20/00 |
| 2021/0142783 A1* | 5/2021 | Kim | ............... | G10L 13/08 |

FOREIGN PATENT DOCUMENTS

| | | |
|---|---|---|
| CN | 113468894 A | 10/2021 |
| CN | 113886526 A | 1/2022 |
| CN | 117201706 A | 12/2023 |
| CN | 117216229 A | 12/2023 |
| CN | 117336410 A | 1/2024 |

OTHER PUBLICATIONS

Notification to Grant Patent Right for Invention in Chinese Application No. 202410030111.0 mailed on Jul. 12, 2024, 5 pages.

Spournias, Alexandros et al., Experimental Evaluation of a Novel Personal Assistant in Greek Language for Ambient Assisted Living Environments employing home robots, 2018 South-Eastern European Design Automation, Computer Engineering, Computer Networks and Society Media Conference, 2018, 8 pages.

Gao, Mingkun et al., Chatbot or Chat-Blocker: Predicting Chatbot Popularity before Deployment, Proceedings of the 2021 ACM Designing Interactive Systems Conference, 1458-1469, 2021.

* cited by examiner

400

```
┌─────────────────────────────────────────────────┐
│ Obtaining a voice corresponding to at least one │
│ segmented word by disassembling a voice request │──410
│ question input by a user based on at least one  │
│ segmented word obtained through segmenting a    │
│ request question text message                   │
└─────────────────────────────────────────────────┘
                        │
                        ▼
┌─────────────────────────────────────────────────┐
│ Obtaining a pronunciation frequency             │
│ corresponding to the at least one segmented     │──420
│ word based on the voice corresponding to the    │
│ at least one segmented word                     │
└─────────────────────────────────────────────────┘
                        │
                        ▼
┌─────────────────────────────────────────────────┐
│ Matching the pronunciation frequency            │
│ corresponding to the at least one segmented     │
│ word with pronunciation frequency ranges        │──430
│ corresponding to each pitch type in a           │
│ management information base to obtain a pitch   │
│ type corresponding to the at least one          │
│ segmented word                                  │
└─────────────────────────────────────────────────┘
                        │
                        ▼
┌─────────────────────────────────────────────────┐
│ Comparing the pitch type corresponding to the   │
│ at least one segmented word and categorizing    │──440
│ segmented words corresponding to a same pitch   │
│ type, and counting a percentage of the each     │
│ pitch type                                      │
└─────────────────────────────────────────────────┘
```

FIG. 4

INTELLIGENT MANAGEMENT SYSTEMS FOR DIGITAL PERSON DIALOGUE BASED ON INTERNET OF THINGS

CROSS-REFERENCE TO RELATED APPLICATIONS

This application claims priority to Chinese Patent Application No. 202410030111.0, filed on Jan. 9, 2024, the entire content of which is hereby incorporated by reference.

TECHNICAL FIELD

The present disclosure relates to the technical field of intelligent dialogue management, and in particular, to an intelligent management system for a digital person dialogue based on Internet of Things (IoT).

BACKGROUND

With the development of Artificial Intelligence, the digital person dialogue system has been widely used in various scenes, such as customer service, education, and entertainment, by providing a more convenient, personalized, and intelligent user experience. Particularly in the field of customer service, digital person dialogue can deliver quick responses to common questions, and at the same time effectively handle a large number of user inquiries, which helps to reduce customer service pressures and improve user experience.

However, there are still some deficiencies in the application of digital person dialogue in the field of customer service, which is reflected in the following two aspects. First, when the user inputs a request question on the dialogue platform, the response provided by the system in the existing technology focuses on the relevance of the response content to the request question while ignoring the urgency of the request question and the current state of communication network of the dialogue platform, resulting in problems such as the selected response content failing to be communicated in a timely manner due to the current state of the communication network, failing to match the urgency of the request question, or the like, which results in ineffective selection of the response content and makes it difficult to purposefully satisfy the user's needs, and diminish the user's usage experience to a certain extent.

Second, in the digital person dialogue, since the digital person can display facial expressions, it can convey emotions more effectively and make the communication more natural. Based on the advantages of the use of facial expressions in the dialogue, the dialogue management of the digital person in the existing technology overly pursues the richness of facial expressions, making the focus of the dialogue management of the digital person focusing on the visual and insufficient attention on the voice expression of the response content, such as intonation and language type. This easily leads to the response of the digital person appearing mechanical and monotonous in the voice, making the overall communication appear unnatural, and the user tends to feel that the dialogue of the digital person is emotionless and dumb, which lowers the dialogue effect.

Therefore, an intelligent management system for a digital person dialogue based on Internet of Things is provided, which can enhance the user experience and make the dialogue between the user and the digital person more natural and vivid.

SUMMARY

One or more embodiments of the present disclosure provide an intelligent management system for a digital person dialogue based on Internet of Things (IoT). The system comprises: a voice request question extraction module, configured to extract a voice request question input by a user from a dialogue platform and obtain an input time point of the voice request question; a demand response time parsing module, configured to analyze a request urgency coefficient of the user based on the voice request question input by the user and determine a demand response time for the voice request question based on the request urgency coefficient; an adaptive response content search and determination module, configured to search and determine an adaptive response content corresponding to the voice request question from a response knowledge base based on the voice request question input by the user and the demand response time; a dialogue scene recognition module, configured to extract a pitch feature from the voice request question input by the user and recognize a dialogue scene corresponding to the voice request question based on the pitch feature; an adaptive dialogue intonation selection module, configured to select an adaptive dialogue intonation based on the dialogue scene corresponding to the voice request question; a management information base, configured to store topic urgency indexes corresponding to a plurality of request topics, store a vocabulary set describing urgency, store a demand response time corresponding to a conventional request urgency coefficient, and store pronunciation frequency ranges and dialogue scenes corresponding to each pitch type, and store appropriate dialogue intonations corresponding to a plurality of dialogue scenes; an adaptive dialogue language selection module, configured to recognize a language type from the voice request question input by the user and determine the language type as an adaptive dialogue voice type; a dialogue expression and implementation module, configured to transmit the adaptive response content, the adaptive dialogue intonation, and the adaptive dialogue voice type of the voice request question to a control terminal, and the control terminal controls a digital person to perform a dialogue expression about the adaptive response content on the dialogue platform in accordance with the adaptive dialogue intonation and the adaptive dialogue voice type.

To analyze the request urgency coefficient of the user based on the voice request question input by the user, the demand response time parsing module is further configured to: obtain a request question text message by performing a textual recognition on the voice request question input by the user; segment the request question text message to obtain at least one segmented word, and recognize a request topic of the voice request question based on the at least one segmented word; obtain a topic urgency index corresponding to the voice request question by matching a recognized request topic with the topic urgency indexes corresponding to the plurality of request topics in the management information base; obtain a successfully-matched segmented word by matching the at least one segmented word obtained through segmenting the request question text message with the vocabulary set describing urgency in the management information base, and calculate an urgency matching degree corresponding to the voice request question using a formula:

$$\text{urgency matching degree} = \frac{\text{count successfully - matched segmented words}}{\text{total count of segmented words}};$$

recognize whether a demand response timestamp exists in the at least one segmented word obtained through segmenting the request question text message, in response to the demand response timestamp existing, calculate a time sensitivity using a formula:

$$\text{time sensitivity} = \left(\frac{1}{e-1}\right)^{\left(\frac{\text{demand response timestamp–input time point of a voice request question}}{\text{reference duration}}\right)},$$

and; determine the request urgency coefficient of the user based on the topic urgency index, the urgency matching degree, and the time sensitivity corresponding to the voice request question using an analysis model, the analysis model being represented as $$Q = \frac{2\alpha * TI + 2\alpha * ED + 6\alpha * TS}{\sqrt{1 + 3(2\alpha * TI + 2\alpha * ED + 6\alpha * TS)^2}},$$

where TI, ED, and TS represent the topic urgency index, the urgency matching degree, and the time sensitivity corresponding to the voice request question, respectively, and a represents a preset weight factor, and α=0.1.

To determine the demand response time for the voice request question based on the request urgency coefficient, the demand response time parsing module is further configured to: determine the demand response time for the voice request question based on the request urgency coefficient of the user and the demand response time corresponding to the conventional request urgency coefficient in the management information base using a parsing algorithm:

$$T = \begin{cases} T_0 * \left(1 - \frac{Q - Q_0}{1 + |Q - Q_0|}\right), & Q > Q_0 \\ T_0, & Q \leq Q_0 \end{cases},$$

where $T_0$ represents the response demand time corresponding to the conventional request urgency coefficient and $Q_0$ represents the conventional request urgency coefficient.

To search and determine the adaptive response content corresponding to the voice request question from the response knowledge base, the adaptive response content search and determination module is further configured to: search in the response knowledge base based on the request question text message using a built-in search algorithm in the system to obtain searched results arranged in ascending order based on relevance degrees and sorting numbers corresponding to the searched results; obtain occupied spaces corresponding to the searched results; detect a communication network transmission speed of a current dialogue platform and predict demand transmission times corresponding to the searched results based on the communication network transmission speed and the occupied spaces corresponding to the searched results; compare the demand response time for the voice request question with the demand transmission times corresponding to the searched results, and select at least one searched result whose demand transmission time is less than or equal to the demand response time as at least one alternative searched result; extract a sorting number corresponding to the at least one alternative searched result from the sorting numbers corresponding to the searched results, evaluate a selection value degree corresponding to the at least one alternative searched result based on the sorting number corresponding to the at least one alternative searched result and a demand transmission time corresponding to the at least one alternative searched result using an evaluation formula:

$$\text{selection value degree} = \log_{(\text{sorting number}+1)}\left[3^{\left(\frac{\text{demand response time–demand transmission time}}{\text{demand response time}}\right)} + 1\right];$$

and sort alternative searched results in descending order according to the selection value degree corresponding to each of the alternative searched results, and select a first-ranked alternative searched result as the adaptive response content corresponding to the voice request question.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein:

FIG. 4 is a flowchart illustrating a process for counting a percentage of each pitch type according to some embodiments of the present disclosure.

DETAILED DESCRIPTION

Figure 1:
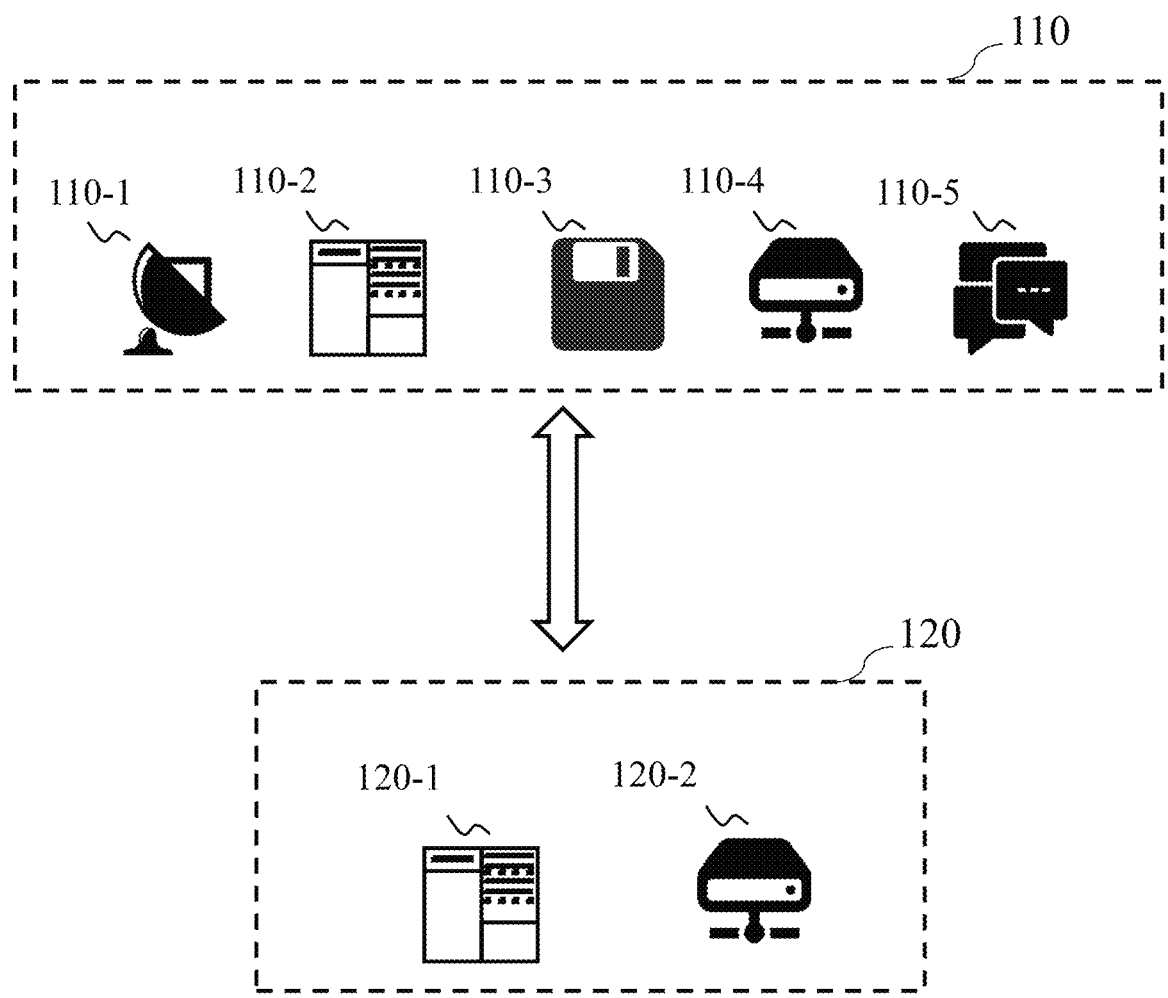
FIG. 1 is a schematic diagram illustrating an application scene of an intelligent management system for a digital person dialogue based on Internet of Things (IoT) according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or arithmetic.

It should be understood that, although the terms "system", "device", "unit", and/or "module" etc., may be used in the present disclosure to differentiate between different components, elements, parts, sections, or assemblies at different levels. However, the words may be replaced by other expressions if other words accomplish the same purpose.

Flowcharts are used in this disclosure to illustrate arithmetic performed by a system according to embodiments of the disclosure. It should be appreciated that the preceding or following arithmetic is not necessarily performed in an exact sequence. Instead, steps can be processed in reverse order or simultaneously. Also, it is possible to add other arithmetic to these processes or remove a step or steps from them.

FIG. 1 is a schematic diagram illustrating an application scene of an intelligent management system for a digital person dialogue based on Internet of Things (IoT) according to some embodiments of the present disclosure.

In some embodiments, as shown in FIG. 1, an intelligent management system for a digital person dialogue based on IoT (hereinafter referred to as a management system) includes a control terminal 110 and a remote terminal 120. The control terminal 110 includes a voice receiving device 110-1, a first processor 110-2, a cached assembly 110-3, a first storage device 110-4, and a dialogue platform 110-5, and the remote terminal 120 includes a server. The server includes a second processor 120-1 and a second storage device 120-2. The control terminal 110 and the remote terminal 120 are communicatively connected with each other.

The control terminal 110 refers to a device for receiving and transmitting an instruction of a user. For example, the control terminal 110 includes a smartwatch, a voice terminal, or the like. The user refers to, for example, a user or manager of the management system.

The voice receiving device 110-1 refers to a device for receiving voice. For example, the voice receiving device 110-1 is a microphone, a headset, a smart speaker, etc. In some embodiments, the voice receiving device 110-1 is configured to receive a voice request question inputted by the user based on the dialogue platform 110-5 and upload the voice request question to the first storage device 110-4.

The first processor 110-2 refers to a processor for accepting and processing the voice request question and sending a simple instruction. For example, the first processor 110-2 is configured as a Microcontroller (MCU) or a combination of one or more of other microprocessors.

In some embodiments, the first processor 110-2 is configured to determine an arithmetic parameter based on a demand response time; based on the arithmetic parameter, determine a target arithmetic terminal and a target arithmetic base, and generate an arithmetic instruction, so as to control the target arithmetic terminal to perform arithmetic based on the arithmetic parameter to obtain an adaptive response content, an adaptive dialogue intonation, and an adaptive dialogue voice type. The arithmetic parameter includes an edge arithmetic or a remote arithmetic.

The arithmetic parameter is a parameter that characterizes a way in which the management system handles an arithmetic of the voice request question. In some embodiments, the arithmetic parameter includes the edge arithmetic and/or the remote arithmetic. The edge arithmetic refers to an arithmetic in which the management system performs data processing via the control terminal. The remote arithmetic refers to an arithmetic in which the management system performs data processing via the remote terminal.

In some embodiments, the second processor 120-1 determines the arithmetic parameter in a variety of ways based on the demand response time. For example, the second processor 120-1 determines the arithmetic parameter to be the edge arithmetic and the remote arithmetic in response to the demand response time being less than or equal to a preset time threshold. As another example, the second processor 120-1 determines the arithmetic parameter to be the remote arithmetic in response to the demand response time being greater than the preset time threshold.

The remote terminal and a plurality of control terminals are communicatively connected and need to process a plurality of kinds of data simultaneously. The shorter the demand response time, the more urgent the demand is, so the edge arithmetic needs to be used to share the pressure of the remote arithmetic, thereby improving arithmetic efficiency.

The target arithmetic terminal is a terminal device that performs an arithmetic according to the arithmetic parameter. In some embodiments, the target arithmetic terminal is the control terminal and/or the remote terminal. A count of the control terminal may be set to one or more. A count of the remote terminal may be set to one.

The target arithmetic base is a response knowledge base on which the calculation is based. In some embodiments, the target arithmetic base includes one or more response knowledge bases.

In some embodiments, the second processor 120-1 is configured to obtain at least one idle control terminal; obtain an arithmetic time and a demand transmission time corresponding to arithmetic performance of the idle control terminal, and determine an idle control terminal with a largest sum of the arithmetic time and the demand transmission time as the target arithmetic terminal for performing the edge arithmetic. The idle control terminal is a control terminal that is currently in an idle state, i.e., a control terminal that is not currently performing arithmetic.

In some embodiments, the second processor 120-1 determines the target arithmetic base based on user feedback data.

User feedback data refers to feedback data of the user on the usage of the management system. The user feedback data includes a user rating, a favorable review, or an unfavorable review, or the like. In some embodiments, the second processor 120-1 filters out user ratings corresponding to a similar voice request question from historical data, and determines at least one historical arithmetic base corresponding to the highest user rating as at least one target arithmetic base. The similar voice request question is a voice request question in the historical data that has the highest similarity to a voice request question of a current user.

In some embodiments, the second processor 120-1 calculates an average retrieval time of the at least one target arithmetic base, calculates a difference between the average retrieval time and the demand response time, and removes a target arithmetic base corresponding to a difference which is negative and whose absolute value is greater than or equal to a user tolerance threshold.

In some embodiments, the second processor 120-1 determines the user tolerance threshold based on the user feedback data. For example, the second processor 120-1 selects a moment in which the user feedback data satisfies a preset rating condition, and calculates a difference between an actual response time and a demand response time at the moment as the user tolerance threshold. The preset rating condition may be preset empirically. For example, the preset rating condition includes an average of all user ratings being less than a preset rating threshold, or a count of the unfavorable review being greater than a preset unfavorable review threshold, etc. The preset rating threshold and the preset unfavorable review threshold may be set empirically.

The arithmetic instruction is an instruction that controls the control terminal to process the edge arithmetic or controls the remote terminal to process the remote arithmetic. In some embodiments, the arithmetic instruction includes an arithmetic content of performing the edge arithmetic and/or an arithmetic content for performing the remote arithmetic.

The arithmetic content may include an arithmetic manner or step corresponding to the voice request question. Each arithmetic content may be one or more arithmetic manners or steps corresponding to the voice request question. In some embodiments, the arithmetic content includes a first arithmetic content which is performed by the control terminal or the remote terminal and a second arithmetic content which is only performed by the remote terminal. The first arithmetic content refers to a step that is simple among arithmetic steps of the voice request question. For example, the first arithmetic content includes vector encoding of a voice, extracting the voice request question, extracting a pitch feature from the voice request question, or the like. The second arithmetic content refers to a step that is more complex among the arithmetic steps of the voice request question. For example, the second arithmetic content includes searching for and determining an adaptive response content from the response knowledge base, recognizing a dialogue scene, selecting an adaptive dialogue intonation, selecting an adaptive dialogue voice type, or other related steps, etc.

In some embodiments, the second processor 120-1 determines the arithmetic instruction based on the demand transmission time, a current load of the second processor 120-1, and arithmetic performance of the control terminal. For more detailed descriptions of the demand transmission time, please refer to FIG. 2 and the related descriptions.

The current load of the second processor 120-1 is positively correlated with a count of a pending voice request question. The arithmetic performance of the control terminal is a parameter that characterizes an arithmetic power of the control terminal. The arithmetic performance is related to an arithmetic time. The shorter the arithmetic time, the stronger the arithmetic performance. The arithmetic time may be obtained based on experiment or historical data. In some embodiments, the second processor 120-1 takes, in the historical data, a ratio of a historical arithmetic time and a baseline arithmetic time of the control terminal for the similar voice request question, as the arithmetic time of the control terminal. The baseline arithmetic time may be preset empirically. For more detailed descriptions of the similar voice request question, please refer the related descriptions above.

In some embodiments, the second processor 120-1 determines a plurality of candidate arithmetic combinations, determines total response times based on demand transmission times corresponding to the plurality of candidate arithmetic combinations, the current load of the second processor 120-1, and the arithmetic performance of the control terminal, determines a candidate arithmetic combination with a shortest total response time as a target arithmetic combination, and determines the arithmetic instruction based on the target arithmetic combination. The candidate arithmetic combination refers to a combination of arithmetic manners corresponding to at least one arithmetic content that needs to be determined for one voice request question. The second processor 120-1 may randomly generate the candidate arithmetic combination. For example, for a particular arithmetic including six arithmetic contents, where first and second arithmetic contents are first arithmetic contents, and third, fourth, fifth, and sixth arithmetic contents are second arithmetic contents. With the edge arithmetic denoted by 1 and the remote arithmetic denoted by 0, randomly-generated candidate arithmetic combinations may include (1, 1, 0, 0, 0, 0), (1, 1, 0, 0, 0, 0), (0, 1, 0, 0, 0, 0), (1, 0, 0, 0, 0, 0), and (0, 0, 0, 0, 0, 0).

The total response time is a total time taken by the candidate arithmetic combination to complete one arithmetic. In some embodiments, the second processor 120-1 determines a wait time based on the current load of the second processor 120-1. The second processor 120-1 may calculate an average of historical arithmetic times corresponding to at least one similar arithmetic content in the historical data, and determine a product of the average and a count of the voice request questions as the wait time. The similar arithmetic content may be historical arithmetic content whose similarity to arithmetic content corresponding to the candidate arithmetic combination is less than a first preset threshold. The first preset threshold may be set empirically.

The total response time is positively correlated with the wait time, the demand transmission time, and the arithmetic time of the control terminal. For example, the second processor 120-1 calculates to obtain the total response time based on a formula (1), which is shown below:

$$\text{Total response time} = \text{wait time} + \max(\text{demand transmission time, arithmetic time of control terminal}) \quad (1)$$

The target arithmetic combination is a combination of arithmetic manners corresponding to at least one arithmetic content that needs to be performed for one voice request question.

In some embodiments, the first processor determines a candidate arithmetic combination with the shortest total response time as the target arithmetic combination, and based on the target arithmetic combination, determines arithmetic content that needs to be performed as the edge arithmetic and/or arithmetic content that needs to be performed as the remote arithmetic. For example, a candidate arithmetic combination (1, 1, 0, 0, 0, 0, 0) has the shortest total response time, then the candidate arithmetic combination (1, 1, 0, 0, 0, 0) is determined as the target arithmetic combination, where first and second arithmetic contents need to perform the edge arithmetic, and third, fourth, fifth, and sixth arithmetic contents need to perform the remote arithmetic.

In some embodiments, the first processor 11-2, based on the arithmetic instruction, causes the control terminal to perform the edge arithmetic and/or causes the remote terminal to perform the remote arithmetic to obtain an adaptive response content, an adaptive dialogue intonation, and an adaptive dialogue voice type. For example, for the target arithmetic combination (1, 1, 0, 0, 0, 0), the control terminal performs the edge arithmetic on the first and second arithmetic contents, and the remote terminal performs the remote arithmetic on the third, fourth, fifth, and sixth arithmetic contents.

In some embodiments, the control terminal extracts text information of the voice request question based on a preset algorithm and generates a confidence level. In response to the confidence level being lower than a preset confidence threshold, the control terminal sends the voice request question to the remote terminal and the remote terminal extracts the text information of the voice request question. The preset algorithm may be set according to a requirement.

In some embodiments, when the control terminal is extracting a pitch feature, the remote terminal issues a sampling instruction to sample the voice request question from the control terminal to extract the pitch feature, the pitch feature extracted by the control terminal and the pitch feature extracted by the remote terminal are compared and analyzed to determine a recognition credibility of the control terminal. A pitch feature whose recognition credibility is lower than a credibility threshold is determined as a target pitch feature. For request questions corresponding to pitch features whose similarities to the target pitch feature is lower than a second preset threshold among pitch features recognized by the control terminal, the request questions are double-checked to improve a sampling rate. The credibility threshold and the second preset threshold may be preset according to requirements. An increase amplitude of the sampling rate is positively correlated with a percentage of a count of pitch features whose recognition credibility is lower than the credibility threshold among the pitch features recognized by the control terminal.

The recognition credibility is a credibility degree of the pitch feature extracted by the control terminal. The recognition credibility is negatively correlated with a difference between the pitch feature extracted by the control terminal and the pitch feature extracted by the remote terminal.

The cached assembly 110-3 refers to a device that is used to temporarily store data. For example, the cached assembly 110-3 is a disk cache, a network cache, or an application cache, etc. In some embodiments, the cached assembly 110-3 is configured to cache the adaptive response content sent by the second processor 120-1 of the remote terminal.

The first storage device 110-4 refers to a data storage unit for storing non-question-and-response content related to the voice request questions input by the user. In some embodiments, the first storage device 110-4 is configured to store the voice request question, the pitch feature, or the like.

The dialogue platform 110-5 is a platform configured to communicate directly with the user. For example, the dialogue platform 110-5 is an instant messenger, a customer service chat tool, etc. In some embodiments, the dialogue platform 110-5 includes an interactive screen, a speaker, or the like. The interactive screen is a screen used to enable user interaction. The speaker is a device used to send a dialogue voice to the user.

The remote terminal 120 is a terminal device for providing and processing a remote service. For example, the remote terminal 120 is a computer or an embedded terminal, etc. The server is a core of the remote terminal 120 and is used to process a request, data, etc. from the remote terminal. In some embodiments, the remote terminal 120 communicates with the server over a network to make a request and receive a response. The server processes the request from the remote terminal and performs the arithmetic via the second processor 120-1.

The second processor 120-1 is a processing device for processing data related to the remote terminal. The second processor 120-1 is used to process a complex arithmetic. For example, the second processor 120-1 is a combination of one or more of an Embedded Processor, a Digital Signal Processor (DSP), or the like.

The second storage device 120-2 refers to a device for storing data and information associated with the remote terminal in the management system. For example, the second storage device 120-2 is an external hard disk array (NAS), a SAN storage device, or RAID array, or the like. In some embodiments, the second storage device 120-2 is configured to store the response knowledge base, a management information base, etc.

For more detailed descriptions of the above, please refer to FIGS. 2 to 5 and the related descriptions.

Figure 2:
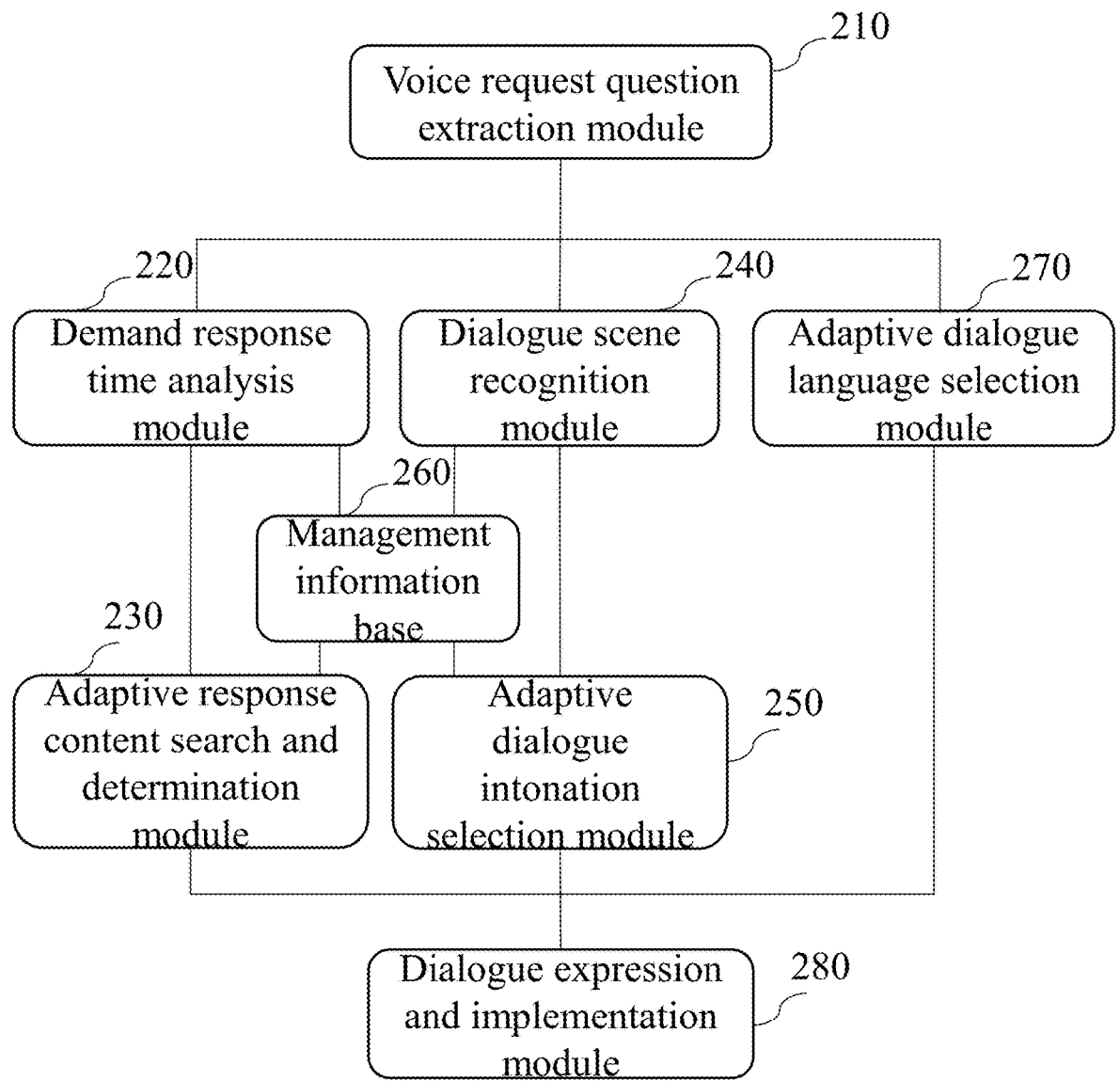
FIG. 2 is a schematic diagram illustrating exemplary modules of an intelligent management system for a digital person dialogue based on Internet of Things (IoT) according to some embodiments of the present disclosure.

FIG. 2 is a schematic diagram illustrating exemplary modules of an intelligent management system for a digital person dialogue based on Internet of Things (IoT) according to some embodiments of the present disclosure.

In some embodiments, as shown in FIG. 2, the management system includes a voice request question extraction module 210, a demand response time parsing module 220, an adaptive response content search and determination module 230, a dialogue scene recognition module 240, an adaptive dialogue intonation selection module 250, a management information base 260, an adaptive dialogue language selection module 270, and a dialogue expression and implementation module 280.

The demand response time parsing module 220, the adaptive dialogue intonation selection module 250, and the dialogue expression and implementation module 280 are integrated into the second processor 120-1. The voice request question extraction module 210, the adaptive response content search and determination module 230, the dialogue scene recognition module 240, and the adaptive dialogue language selection module 270 are integrated into the first processor 110-2 or the second processor 120-1. The later descriptions are illustrated with the second processor 120-1 as an example.

In some embodiments, the voice request question extraction module 210 is configured to extract a voice request question input by a user from a dialogue platform and obtain an input time point of the voice request question. The voice request question extraction module 210 is configured on the voice receiving device 110-1.

The voice request question input by the user is a voice request question that the user has entered into the management system under a current dialogue via the dialogue platform.

The voice request question is a request or query in a voice form that is entered by the user on the dialogue platform. For example, a voice query from the user asking for an instruction on how to use a voice box.

In some embodiments, the second processor 120-1 receives, via the voice receiving device 110-1, the voice request question entered by the user on the dialogue platform.

The input time point is a point in time at which the user inputs the voice request question on the dialogue platform.

In some embodiments, the demand response time parsing module 220 is configured to analyze a request urgency coefficient of the user based on the voice request question input by the user and determine a demand response time for the voice request question based on the request urgency coefficient.

The request urgency coefficient is a coefficient used to measure an urgency of the voice request question. The greater the request urgency coefficient, the more urgent the voice request question.

In some embodiments, the second processor 120-1 determines the request urgency coefficient based on the voice request question in a plurality of ways. For example, the second processor 120-1 looks up a preset coefficient table to determine the request urgency coefficient based on the voice request question. The preset coefficient table includes a mapping relationship between the voice request question and the request urgency coefficient. The mapping relationship may be determined based on experience or historical data.

The demand response time reflects a time for the management system to respond to the voice request question of the user. The demand response time is a time from a moment when the user inputs the voice request question to a moment when a digital person completes a dialogue expression.

In some embodiments, the demand response time is negatively correlated with the request urgency coefficient. The second processor 120-1 may look up a preset time table to determine the demand response time. The preset time table includes a mapping relationship between the request urgency coefficient and the demand response time. The preset time table may be set based on historical data or experience.

In some embodiments, the adaptive response content search and determination module 230 is configured to search and determine an adaptive response content corresponding to the voice request question from a response knowledge base based on the voice request question input by the user and the demand response time.

The response knowledge base is a database that stores content and information of questions and responses related to the management system. The response knowledge base may be set based on historical data and/or preset based on experience. For example, the response knowledge base stores a voice request questions and corresponding adaptive response contents, etc., in historical dialogue records. As another example, the response knowledge base includes preset voice request questions and corresponding adaptive response contents.

The adaptive response content is a response message that matches the voice request question of the user. For example, if the user sends out the voice query asking for an instruction on how to use the voice box, the adaptive response content may be an instruction on how to use the voice box, precautions to be taken, or other contents.

In some embodiments, the second processor 120-1 determines the adaptive response content in a plurality of ways. For example, the second processor 120-1 determines, an adaptive response content corresponding to a similar voice request question which is searched out from the response knowledge base, as the adaptive response content corresponding to the voice request question. For more detailed descriptions of the similar voice request question, please refer to FIG. 1 and the related descriptions.

In some embodiments, the adaptive response content search and determination module 230 includes a first sub-module and a second sub-module. The first sub-module is integrated into the first processor 110-2 and the second sub-module is integrated into the second processor 120-1. In some embodiments, the first sub-module is configured to send a search instruction to the second sub-module. The second sub-module is configured to search for and determine the adaptive response content corresponding to the voice request question from the response knowledge base based on the voice request question and the demand response time, and send the adaptive response content to a cached assembly of a control terminal for caching. The response knowledge base is configured in the second storage device 120-2.

The search instruction is an instruction that the control terminal searches in a remote terminal.

In some embodiments, the first processor 110-2 issues the search instruction to the second processor 120-1 based on the voice request question and the demand response time. The second processor 120-1 performs a search based on the search instruction.

In some embodiments, the dialogue scene recognition module 240 is configured to extract a pitch feature from the voice request question input by the user and recognize a dialogue scene corresponding to the voice request question based on the pitch feature.

The pitch feature is used to reflect a feature and a change feature of a pitch when the user inputs the voice request question. For example, the pitch feature is represented by a pitch change curve. The pitch change curve is a curve of pitch change over time when the user inputs the voice request question.

In some embodiments, the second processor 120-1 obtains and counts pitches at a plurality of moments when the user inputs the voice request question, and generates the pitch change curve based on a counting result.

In some embodiments, the pitch feature includes a percentage and a pitch undulation of each pitch type, and the second processor 120-1 determines the pitch feature based on at least one segmented word corresponding to the voice request question. For more detailed descriptions, please refer to FIG. 4 and the related descriptions.

The dialogue scene is a communication atmosphere or situation of request and response and is usually related to the topic and mood of a dialogue. For example, the dialogue scene is lighthearted and cheerful, or serious and solemn, etc.

In some embodiments, the second processor 120-1 determines the dialogue scene based on the pitch feature in a variety of manners. For example, the second processor 120-1 looks up a preset scene table based on the pitch change curve, calculates a similarity between historical pitch change curves and the pitch change curve, and determines a historical dialogue scene corresponding to a historical pitch change curve with the smallest similarity as the dialogue scene. The preset scene table is used to store historical pitch change curves and historical dialogue scenes corresponding to the historical pitch change curves. The similarity between the historical pitch change curve and the pitch change curve may be determined by a statistical value of distances of a plurality of points between straight lines. The statistical value may be a sum of distances or an average of the distances.

In some embodiments, the dialogue scene recognition module 240 further includes a noise reduction processing element. The noise reduction processing element is configured to perform a noise reduction on the voice request question to generate a noise-reduced voice request question. The dialogue scene recognition module 240 may extract the pitch feature based on the noise-reduced voice request question, and recognize the dialogue scene corresponding to the voice request question based on the pitch feature.

The noise reduction processing element is a device configured to perform a noise reduction on an audio content of the voice request question. For example, a filter, a metal shield, etc.

In some embodiments, the noise reduction processing element reduces an audio noise by noise analyzing, filtering the audio content, etc.

In some embodiments, the second processor 120-1 extracts the pitches at a plurality of moments of the voice request question based on the voice receiving device 110-1, and counts the pitches at a plurality of moments to obtain the pitch feature. For more detailed descriptions of the pitch feature, please refer to the related descriptions above.

In some embodiments of the present disclosure, an extraction quality of the pitch feature can be improved by performing the noise reduction on the voice request question, which is conducive to improving the recognition accuracy of the dialogue scene.

In some embodiments, the adaptive dialogue intonation selection module 250 is configured to select an adaptive dialogue intonation based on the dialogue scene corresponding to the voice request question.

The adaptive dialogue intonation is an intonation in which the digital person performs a dialogue expression. For example, the adaptive dialogue intonation is friendly, cordial, earnest, focused, serious, etc. Different adaptive dialogue intonations correspond to different preset intonations, and the preset intonations may be set based on experience. For example, if the dialogue scene corresponding to the voice request question is serious, a serious and calm intonation is chosen as the adaptive dialogue intonation.

In some embodiments, the second processor 120-1 determines the adaptive dialogue intonation based on the dialogue scene in a plurality of ways. For example, the second processor 120-1 determines the adaptive dialogue intonation by looking up a preset intonation table based on the dialogue scene. The preset intonation table includes a mapping relationship between the dialogue scene and the adaptive dialogue intonation, and the preset intonation table may be set based on experience. For example, the adaptive dialogue intonation is relaxed and cheerful when the dialogue scene is friendly, and the adaptive dialogue intonation is serious and focused when the dialogue scene is serious and solemn.

In some embodiments, the adaptive dialogue intonation selection module 250 is further configured to compare the dialogue scene corresponding to the voice request question with a plurality of dialogue scenes in the management information base, and determine an appropriate dialogue intonation corresponding to a dialogue scene in the management information base which is consistent with the dialogue scene corresponding to the voice request question as the adaptive dialogue intonation corresponding to the voice request question. For more detailed descriptions of the management information base, please refer to the related descriptions below.

Being consistent may be determined based on a similarity. For example, a dialogue scene which is consistent with the dialogue scene is a dialogue scene that has the greatest similarity with the dialogue scene corresponding to the voice request question among the plurality of dialogue scenes in the management information base. The second processor 120-1 may determine an appropriate dialogue intonation corresponding to the dialogue scene that has the greatest similarity in the management information base as the adaptive dialogue intonation corresponding to the voice request question.

In some embodiments of the present disclosure, by selecting a similar appropriate dialogue intonation as the adaptive dialogue intonation corresponding to the voice request question from the historical data of the management information base, a current dialogue can be made more natural and coherent, and a sense of user engagement can be enhanced.

In some embodiments, the adaptive dialogue intonation selection module 250 is further configured to issue an adjustment instruction to adjust the adaptive dialogue intonation of the dialogue platform based on a user own feature.

The user own feature is a feature used to indicate the user's personality, for example, the user is acute, patient, or has good or bad temper. The user own feature may be determined based on a voice speed, the pitch feature, and a voice loudness of the voice request question. For example, a user with a slow voice speed, a low pitch, and a low voice loudness may be patient. As another example, a user with a fast voice speed, a high pitch, and a high voice loudness may be acute. For more detailed descriptions of the user own feature, please refer to the related descriptions below in FIG. 2.

The voice loudness reflects a volume level of the voice request question. In some embodiments, the voice loudness is an average of loudness of the voice request question, e.g., 46 dB, etc.

The voice speed reflects a voice speed of the user when inputting the voice request question. In some embodiments, the voice speed is an average of a duration of each word.

In some embodiments, the second processor 120-1 extracts, based on the voice receiving device 110-1, volumes of the voice request question at a plurality of moments, a count of words of the voice request question, and a duration of the user inputting the voice request question, count an average of the volumes at the plurality of moments as the voice loudness, and count an average duration used for the each word as the voice speed. For more detailed descriptions of the pitch feature, please refer to the related descriptions above.

The adjustment instruction is an instruction that makes an adjustment to the adaptive dialogue intonation. For example, the adjustment instruction is to adjust the voice speed faster or slower.

In some embodiments, the second processor 120-1 determines the adjustment instruction based on the user own feature. For example, when the user own feature is patient, an adjustment instruction to slow down the voice speed is generated. As another example, when the user own feature is acute, an adjustment instruction to accelerate the voice speed is generated.

In some embodiments, a processor adjusts a sound pitch or a playback speed of a loudspeaker of the dialogue platform based on the adjustment instruction. For example, the processor adjusts the playback speed of the loudspeaker of the dialogue platform faster or slower based on the adjustment instruction to slow down the voice or the adjustment instruction to accelerate the voice speed.

In some embodiments of the present disclosure, the management system selects a suitable pitch and adjusts the adaptive dialogue intonation according to the user own feature, which can improve the user experience and make a dialogue more natural and personalized, and thus enhance the interaction effect between the user and the management system.

In some embodiments, the management information base 260 is configured to store topic urgency indexes corresponding to a plurality of request topics, store a vocabulary set describing urgency, store a demand response time corresponding to a conventional request urgency coefficient, and store pronunciation frequency ranges and dialogue scenes corresponding to each pitch type, and store appropriate dialogue intonations corresponding to a plurality of dialogue scenes. The management information base 260 is configured on the second storage device 120-2.

The request topic is key information in the voice request question.

The topic urgency index is an index of an urgency corresponding to different request topics in a historical dialogue record.

The vocabulary set describing urgency is a collection of words used to express the concept of urgency or emergency. For example, the vocabulary set describing urgency includes "as soon as possible", "quickly", "urgent", "immediately", "in need of help", or other words that describe an urgency. The vocabulary set describing urgency may be preset empirically.

The conventional request urgency coefficient is a numerical metric used to quantify and assess an urgency of a user request in a routine scene. The routine scene may be a scene where the voice request question is not urgent.

The demand response time corresponding to the conventional request urgency coefficient is a reference value for the time for the management system to respond to the voice request question of the user in the routine scene.

In some embodiments, the conventional request urgency coefficient and the demand response time corresponding to the conventional request urgency coefficient are preset based on experience.

The pronunciation frequency range is intervals of sound frequencies corresponding to each pitch type in the voice request question.

In some implementations, the management information base obtains, from the second storage device 120-2, historical data generated by the control terminal or the remote terminal in the historical dialogue record and counts the historical data to obtain the topic urgency indexes corresponding to a plurality of request topics, the vocabulary set describing urgency, the demand response time corresponding to the conventional request urgency coefficient, the pronunciation frequency ranges and dialogue scenes corresponding to each pitch type, and the appropriate dialogue intonations corresponding to a plurality of dialogue scenes.

For example, the pronunciation frequency ranges corresponding to each pitch type are obtained by counting sound frequencies of all pitch types in the historical dialogue record.

As another example, the second processor 120-1 counts voice request questions in the historical dialogue record that do not contain a vocabulary word included in the vocabulary set describing the urgency and determines dialogue scenes corresponding to the voice request questions as routine scenes, counts an average of request urgency coefficients under the routine scene as the conventional request urgency coefficient, and counts an average of demand response times under the conventional scene as the demand response time, and stores parameters obtained from the above counting into the management information base.

In some embodiments, the adaptive dialogue language selection module 270 is configured to recognize a language type from the voice request question input by the user and determine the language type as an adaptive dialogue voice type.

The language type is a type of specific language or dialect used by the user in a dialogue. For example, the language type includes languages of different countries such as Mandarin, English, and Japanese. As another example, the language type includes dialects of different regions such as Southern Fujian and Cantonese.

In some embodiments, the second processor 120-1 determines the language type based on a preset algorithm or a preset program. The preset algorithm may be character frequency analysis, feature extraction, or other language recognition algorithms, etc. For example, the preset program is an existing translation application or text analysis tool.

The adaptive dialogue voice type is a voice type adaptive to a voice type corresponding to the language type used by the user when the digital person performs the dialogue expression.

For example, the second processor 120-1 recognizes that the language type of the voice request question is Mandarin, and then Mandarin is used as the adaptive dialogue voice type.

In some embodiments, the dialogue expression and implementation module 280 is configured to transmit the adaptive response content, the adaptive dialogue intonation, and the adaptive dialogue voice type of the voice request question to the control terminal, and the control terminal controls the digital person to perform a dialogue expression about the adaptive response content on the dialogue platform in accordance with the adaptive dialogue intonation and the adaptive dialogue voice type.

The digital person is a virtual character or agent based on artificial intelligence technology and digital representation, and the digital person can simulate a voice intonation of a human. For example, a virtual customer service.

In some implementations, the dialogue platform outputs a voice of the adaptive response content to the user via the loudspeaker.

For example, when recognizing that the user asks for the instruction on how to use a voice box in a high pitch Mandarin, the second processor 120-1, based on the control terminal, controls the digital person to output an instruction on how to use a voice box in a high pitch Mandarin via the dialogue platform and convey to the user via the loudspeaker.

For more detailed descriptions of modules of the management system, please refer to the associated embodiments below.

In some embodiments, the management system further includes a user feedback module. The user feedback module is configured to determine an ideal response content corresponding to the voice request question based on user feedback data.

In some embodiments, the user feedback module is integrated into the second processor 120-1.

The user feedback data is feedback information of the adaptive response content for the user. For example, the user feedback data includes a user like or a user rating of a particular adaptive response content. The second processor 120-1 may obtain the user feedback data uploaded by the user to the dialogue platform via the control terminal.

The ideal response content is an adaptive response content that satisfies the user. In some embodiments, the second processor 120-1 determines an adaptive response content whose user feedback data satisfies a preset feedback condition as the ideal response content. The preset feedback condition may be a user rating greater than or equal to a preset rating. The preset rating may be set based on experience. For example, if the user rating is out of 5, the preset feedback condition may be a user rating greater than or equal to 4.

In some embodiments of the present disclosure, generating the ideal response content based on the user feedback data can improve the accuracy and relevance of a response, enhance the user experience and satisfaction, and thereby better meet needs of the user.

In some embodiments of the present disclosure, various modules working in concert can achieve efficient voice recognition, request analysis, and response generation, thereby enhancing the user interaction experience, ensuring timely response to needs of the user, optimizing dialogue management, and enhancing the intelligence of the management system.

In some embodiments, to analyze the request urgency coefficient of the user based on the voice request question input by the user includes steps S11 to S16, and the demand response time parsing module 220 is further configured to perform steps S11 to S16. The demand response time parsing module 220 is integrated into the second processor 120-1.

Step S11, obtaining a request question text message by performing a textual recognition on the voice request question input by the user.

The textual recognition is a recognition manner of converting voice information into text information.

The request question text message is a text message corresponding to the voice request question.

In some embodiments, the second processor 120-1 performs the textual recognition in a variety of manners. For example, the second processor 120-1 obtains the request question text message from the voice request question through feature extraction or using an acoustic model, etc.

As another example, the second processor 120-1 converts the voice request question into the request question text message via a voice assistant, etc.

Step S12, segmenting the request question text message to obtain at least one segmented word, and recognizing a request topic of the voice request question based on the at least segmented word.

Segmenting the request question text message is a process of cutting continuous text into words or sub-words. The segmented word is a word or a sub-word through segmenting the request question text message. One request question text message corresponding to one voice request question may be segmented to obtain one or more segmented words. The request topic is key information in the request question text message. For more detailed descriptions of the segmented word and the request topic, please refer to the associated embodiments below.

Step S13, obtaining a topic urgency index corresponding to the voice request question by matching a recognized request topic with the topic urgency indexes corresponding to the plurality of request topics in the management information base.

The topic urgency index corresponding to the voice request question is an index reflecting an urgency of a request topic in the current dialogue.

In some embodiments, the second processor 120-1 matches to obtain the topic urgency index in a plurality of manners. For example, the second processor 120-1 determines a topic urgency index corresponding to a request topic with the greatest similarity to the request topic in the management information base as the topic urgency index corresponding to the voice request question. When a plurality of request topics with the greatest similarity to the request topic exist, an average of topic urgency indexes corresponding to the plurality of request topics is taken as the topic urgency index corresponding to the voice request question.

Step S14, obtaining a successfully-matched segmented word by matching the at least one segmented word obtained through segmenting the request question text message with the vocabulary set describing urgency in the management information base, and determining an urgency matching degree corresponding to the voice request question based on a total count of segmented words and a count of successfully-matched segmented words.

For more detailed descriptions of the vocabulary set describing urgency, please refer to FIG. 2.

The total count of segmented words is a count of segmented words obtained by segmenting the voice request question input by a current user. The count of successfully-matched segmented words is a total count of segmented words of at least one segmented word of the voice request question that have been successfully matched in the management information base.

In some embodiments, the second processor 120-1 determines a segmented word whose similarity with a word in the vocabulary set describing the urgency is greater than a preset matching threshold as the successfully-matched segmented word. The preset matching threshold is a similarity threshold for determining whether a match is successful. The preset matching threshold may be set empirically.

The urgency matching degree reflects a degree to which the at least one segmented word matches successfully in the vocabulary set describing urgency.

In some embodiments, the urgency matching degree is positively correlated with the count of successfully-matched segmented words and negatively correlated with the total count of segmented words. For example, the second processor 120-1 calculates the urgency matching degree corresponding to the voice request question using a formula (3). For more detailed descriptions of the formula (3), please refer to the associated embodiments below.

Step S15, recognizing whether a demand response timestamp exists in the at least one segmented word obtained through segmenting the request question text message, in response to the demand response timestamp existing, calculating a time sensitivity using a calculation formula.

The demand response timestamp is a timestamp corresponding to a time when the user wishes to get a response. For more detailed descriptions of the demand response timestamp, please refer to the associated embodiments below.

The input time point is a starting moment when the user inputs the voice request question. The time sensitivity is a reflection of how sensitive the user is to the time when the user wishes to get a response. The closer the demand response timestamp is to the input time point, the greater the time sensitivity.

The calculation formula is a formula used to calculate the time sensitivity. In some embodiments, the time sensitivity is positively correlated with a difference between the demand response timestamp and the input time point of the voice request question. For example, the calculation formula is a formula (4), and the second processor 120-1 calculates the time sensitivity using the formula (4) based on the demand response timestamp and the input time point of the voice request question. For more detailed descriptions of the formula (4), please refer to the associated embodiments below.

In some embodiments, the demand response time parsing module 220 is further configured to generate a request time interval based on the pitch feature, the voice loudness, the voice speed, and the request topic in response to the demand response timestamp not existing, and generate the time sensitivity based on the request time interval.

For more detailed descriptions of the voice loudness and the voice speed, please refer to FIG. 2. For more detailed descriptions of the pitch feature, please refer to FIGS. 2 and 4. For more detailed descriptions of the request topic, please refer to the related descriptions above.

The request time interval is an interval time between an ideal response time of the user and the input time point of the voice request question.

In some embodiments, the second processor 120-1 constructs a first feature vector based on the voice speed, the pitch feature, and the voice loudness, and queries a user feature table to determine the user own feature. The second processor 120-1 constructs a second feature vector based on the pitch feature, the request topic, and the user own feature, and determines the request time interval by querying a time table.

Figure 5:
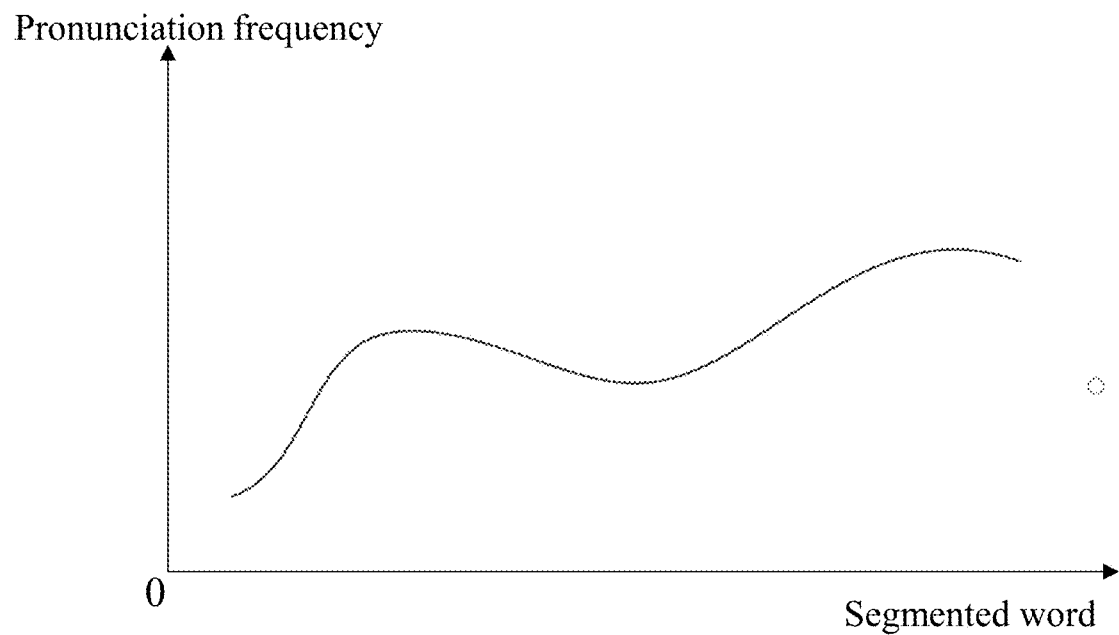
FIG. 5 is a schematic diagram illustrating a variation curve of pronunciation frequency according to some embodiments of the present disclosure.

For more detailed descriptions of the user own feature, please refer to FIG. 5. In some embodiments, the user own feature is represented as vectors. For example, the user own feature is (A, B), where A is a degree value reflecting an impatient character, and B is a degree value reflecting a good temper, and values of A and B are in a range of 0 to 100, the larger the value of A, the more impatient the user is, and the larger the value of B, the better the temper of the user is.

The user feature table is a table related to the user own feature. The user feature table includes a plurality of mapping relationships between the first feature vector and the user own feature. The user feature table may be determined based on experience or the historical dialogue record. For example, a user with fast voice speed may be more impatient, etc., and A may be a larger value. As another example, the second processor 120-1 determines the user own feature, based on a user rating corresponding to a same or a similar response (including a response content and a response time) in the historical dialogue record corresponding to a same voice request question. For example, the lower the user rating, the worse the temper of the user, and B may be a smaller value.

The time table is a table related to the request time interval. The time table includes a plurality of mapping relationships between the second feature vector and the request time interval. The time table may be statistically determined based on the historical data. For example, the second processor 120-1 designates a longest time interval in which a count of times that the user rating is greater than a preset threshold is greater than a preset count of times threshold preset by the user under statistically same or similar second reference vectors as a request time interval corresponding to the second reference vector.

In some embodiments, the second processor 120-1 further determines the request time interval using a time interval model. For more information on the time interval model, please refer to FIG. 3 and the related descriptions.

In some embodiments, the second processor 120-1 calculates and obtains the time sensitivity by introducing the request time interval as the demand response timestamp into the formula (4). For more detailed descriptions of the formula (4), please refer to the associated embodiments below.

In response to the demand response timestamp not existing, the time sensitivity is determined by reasonably determining an alternative parameter of the demand response timestamp, i.e., the request time interval, so to ensure that a request urgency coefficient that is subsequently determined is realistic.

Step S16, determining the request urgency coefficient of the user based on the topic urgency index, the urgency matching degree, and the time sensitivity corresponding to the voice request question using an analysis model. For more detailed descriptions of the request urgency coefficient, please refer to FIG. 5.

The analysis model is an algorithm used to determine the request urgency coefficient. For example, the analysis model is represented by a formula (5), and the second processor 120-1 determines the request urgency coefficient of the user based on the topic urgency index, the urgency matching degree, and the time sensitivity corresponding to the voice request question using the formula (5). For more detailed descriptions of the formula (5), please refer to the associated embodiments below.

For more detailed descriptions of steps S11 to S16, please refer to the associated embodiments below.

Starting from three dimensions of topic, vocabulary, and time sensitivity of the voice request question, a multidimensional analysis of the request urgency coefficient is conducted. This manner avoids the one-sidedness and limitations of single-dimensional analysis, maximizing the accuracy of the analysis result and providing a reliable reference for parsing the demand response time for the voice request question.

In some embodiments, to determine the demand response time for the voice request question based on the request urgency coefficient, the demand response time parsing module 220 is further configured to determine the demand response time for the voice request question based on the request urgency coefficient of the user and the demand response time corresponding to the conventional request urgency coefficient in the management information base using a parsing algorithm. For more detailed descriptions of the demand response time, the request urgency coefficient, and the conventional request urgency coefficient, please refer to FIG. 2.

The parsing algorithm is an algorithm for determining the demand response time. In some embodiments, the demand response time is positively correlated with the conventional request urgency coefficient, and the demand response time corresponding to the conventional request urgency coefficient, and is negatively correlated with the request urgency coefficient. For example, the parsing algorithm is represented by a formula (6). For more detailed descriptions of the formula (6), please refer to the associated embodiments below.

Calculating the demand response time using the parsing algorithm takes into account the combined effect of the request urgency coefficient and the conventional request urgency coefficient, which leads to a more accurate demand response time through calculation.

In some embodiments, to search and determine the adaptive response content corresponding to the voice request question from the response knowledge base includes steps S21 to S26, and the adaptive response content search and determination module 230 is further configured to perform steps S21 to S26. The second sub-module of the adaptive response content search and determination module 230 may perform steps S21 to S26 via the second sub-module. The second sub-module is integrated on a second processor 120-1.

Step S21, searching in the response knowledge base based on the request question text message using a built-in search algorithm in the management system to obtain searched results arranged in ascending order based on relevance degrees and sorting numbers corresponding to the searched results.

For more detailed descriptions of the response knowledge base, please refer to FIG. 2.

The searched result is a historical dialogue obtained by searching from the response knowledge base.

The relevance degree is a degree to which the searched result is related to the request question text message. The built-in search algorithm is an algorithm that searches for a similar historical dialogue record from the response knowledge base. The built-in search algorithm may be empirically preset and stored in the second storage device 120-2 of the management system. For example, the search algorithm compares similarities between the request question text message and request questions in historical dialogue records in the response knowledge base, obtains a similarity corresponding to each historical dialogue record, and designates the similarity corresponding to each historical dialogue record as a relevance degree corresponding to the each historical dialogue record, and select a historical dialogue record whose similarity satisfies a preset relevance condition as the searched result. The search algorithm may also be other preset search algorithms. The preset relevance condition may be the relevance degree greater than a preset relevance threshold.

The sorting number is a serial number of the searched result, the higher the relevance degree, the smaller the sorting number.

Step S22, obtaining occupied spaces corresponding to the searched results.

The occupied space is a memory space occupied by the searched result in the second storage device 120-2. In some embodiments, the second processor 120-1 obtains an occupied space corresponding to at least one searched result via the second storage device 120-2.

Step S23, detecting a communication network transmission speed of a current dialogue platform and predicting demand transmission times corresponding to the searched results based on the communication network transmission speed and the occupied spaces corresponding to the searched results.

The current dialogue platform is a dialogue platform of a control terminal used by the user under a current dialogue. The communication network transmission speed is used to reflect a speed at which the dialogue platform sends and receives data. The second processor 120-1 may directly obtain the communication network transmission speed based on the dialogue platform.

The demand transmission time is a duration that the searched result takes to be transmitted between a control terminal and a remote terminal.

In some embodiments, the demand transmission time corresponding to the searched result is positively correlated with the occupied space of the searched result, and negatively correlated with the communication network transmission speed. For example, the second processor 120-1 calculates the demand transmission time using a formula (7). For more detailed descriptions of the formula (7), please refer to the associated embodiments below.

Step S24, comparing the demand response time for the voice request question with the demand transmission times corresponding to the searched results, and selecting at least one searched result whose demand transmission time is less than or equal to the demand response time as at least one alternative searched result.

The alternative searched result is a searched result which needs to be confirmed.

In some embodiments, the second sub-module is further configured to: in response to a ratio of a count of searched results whose demand transmission time is less than or equal to the demand response time to a total count of searched results, satisfy a preset ratio condition, select a preset count of searched results from historical selection data in the management information base as alternative searched results. The preset count is related to the request topic.

The preset ratio condition may be that a ratio of a count of alternative searched results to the total count of searched results is greater than or equal to a ratio threshold. For example, the ratio threshold is 90%. In some embodiments, the second processor 120-1 determines the ratio threshold based on the topic urgency index. The ratio threshold is negatively correlated with the topic urgency index. The greater the topic urgency index, the more urgent the voice request question is, then a time factor needs to be prioritized, and lowering the ratio threshold reduces a count of alternative searched results that need to be processed, which reduces a processing time of the alternative searched results. For more detailed descriptions of the topic urgency index, please refer to FIG. 2.

In some embodiments, in the management information base, if there is a plurality of request topics corresponding to a same voice request question, then a maximum topic urgency index corresponding to the request topic is selected as the topic urgency index for calculating the ratio threshold. Initial values of different types of request topics and ratio thresholds corresponding to different types of request topics may be preset values. The preset value may be set empirically, for example, the preset value is 0.9.

In some embodiments, the second processor 120-1 determines the ratio threshold based on user feedback from the edge arithmetic. For example, in the user feedback, in response to a favorable review rate being lower than a preset probability threshold, it is indicated that improving the efficiency of a question-and-response through the edge arithmetic is not meaningful, then the ratio threshold is reduced, and determining the adaptive response content through the remote arithmetic is prioritized. A reduction amplitude may be preset by the user, such as 20%, etc.

The historical selection data refers to the historical dialogue records stored in the management information base, and historical question-and-response data includes adaptive response contents corresponding to voice request questions in the historical dialogue records.

The preset count is a count of searched results obtained from the management information base. In some embodiments, the second processor 120-1 determines the preset count in a plurality of manners. For example, the second processor 120-1 designates a count of historical voice request questions in the historical dialogue records that are similar to the voice request question as the preset count.

As another example, the second processor 120-1 designates the preset count based on the count of historical voice request questions that are similar to the voice request question and a count coefficient. The second processor 120-1 may determine voice request questions in the historical dialogue records whose similarity to a current voice request question is greater than a similarity threshold as similar voice request questions. The preset count is positively correlated with a count of similar voice request questions and the count coefficient. For example, the second processor 120-1 calculates and obtains the preset count using a formula (2). The formula (2) is represented below:

preset count=count coefficient×count of similar voice request questions     (2)

The count coefficient is a constant used to determine the preset count. The count coefficient is greater than 0.

In some embodiments, the second processor 120-1 first filters out voice request questions that are similar to the current voice request question from the historical dialogue records; in response to a demand response timestamp existing in the current voice request question, selects historical dialogue records with historical demand response timestamps as first target data, and determines the count coefficient based on a ratio of an average of demand response times in the first target data for which user feedback is favorable to a current demand response timestamp. The count coefficient may be set to a ratio in response to the ratio being less than or equal to 1. The count coefficient may be set to 1 in response to the ratio being greater than 1.

In some embodiments, in response to the demand response timestamp in the current voice request question not existing, the second processor 120-1 selects historical dialogue records without the historical demand response timestamp as second target data, and determines the count coefficient based on a ratio of a time sensitivity corresponding to the current voice request question to an average of historical time sensitivities in the second target data for which user feedback is favorable. The count coefficient may be set to a ratio in response to the ratio being less than or equal to 1. The count coefficient may be set to 1 in response to the ratio being greater than 1.

From the management information base, selecting the historical dialogue record that is similar to the voice request question can improve the accuracy of the search, while determining different alternative searched results based on differences between different voice request questions (e.g., whether or not contains a demand response timestamp, count of request topics, different topic urgency indices, etc.) can improve the efficiency of the data processing, thereby increasing user satisfaction.

Step S25, extracting a sorting number corresponding to the at least one alternative searched result from the sorting numbers corresponding to the searched results, evaluating a selection value degree corresponding to the at least one alternative searched result based on the sorting number corresponding to the at least one alternative searched result, the demand transmission time, and the demand response time.

The selection value degree is an extent to which a selected alternative searched result is useful for subsequent arithmetic.

In some embodiments, the selection value degree is positively correlated with the sorting number corresponding to the alternative searched result, and negatively correlated with the demand transmission time corresponding to the alternative searched result. The second processor may determine the selection value degree corresponding to the at least one alternative searched result based on the sorting number corresponding to the at least one alternative searched result and the demand transmission time corresponding to the at least one alternative searched result using an evaluation formula. The evaluation formula is a formula for evaluating the selection value degree corresponding to the alternative searched result. For example, the evaluation formula is represented by a formula (8), and the second processor 120-1 calculates the selection value degree using the formula (8). For more detailed descriptions of the formula (8), please refer to the associated embodiments below.

Step S26, sorting alternative searched results in descending order according to the selection value degree corresponding to each of the alternative searched results, and selecting a first-ranked alternative searched result as the adaptive response content corresponding to the voice request question.

For more detailed descriptions of the adaptive response content, please refer to FIG. 2.

For more detailed descriptions of the steps S21 to S26, please refer to the associated embodiments below.

By searching for records that are similar to the request question text message in the historical dialogue records in the response knowledge base, and determining the adaptive response content based on the records that are similar, it can greatly improve a response speed of the response, and at the same time prevent the search engine from operating unnecessarily, which is conducive to saving search resources.

In some embodiments, the second sub-module is further configured to: compare similarities between the request question text message and the voice request questions in the historical dialogue records to obtain a request question similarity corresponding to each of the historical dialogue records; select historical dialogue records whose request question similarity satisfies a preset similarity condition as reference dialogue records, and extract a historical response content from the reference dialogue records as the adaptive response content corresponding to the voice request question.

The preset similarity condition may be either the request question similarity being maximum or the request question similarity being greater than a preset value.

For more detailed descriptions of the request question similarity, please refer to the associated embodiments below.

By taking into account the historical dialogue records, i.e., when there is the same request question in the historical dialogue records, extracting response contents from the historical dialogue records for the current dialogue can greatly improve the response speed, and at the same time prevent the search engine from operating unnecessarily, which is conducive to saving search resources.

Figure 3:
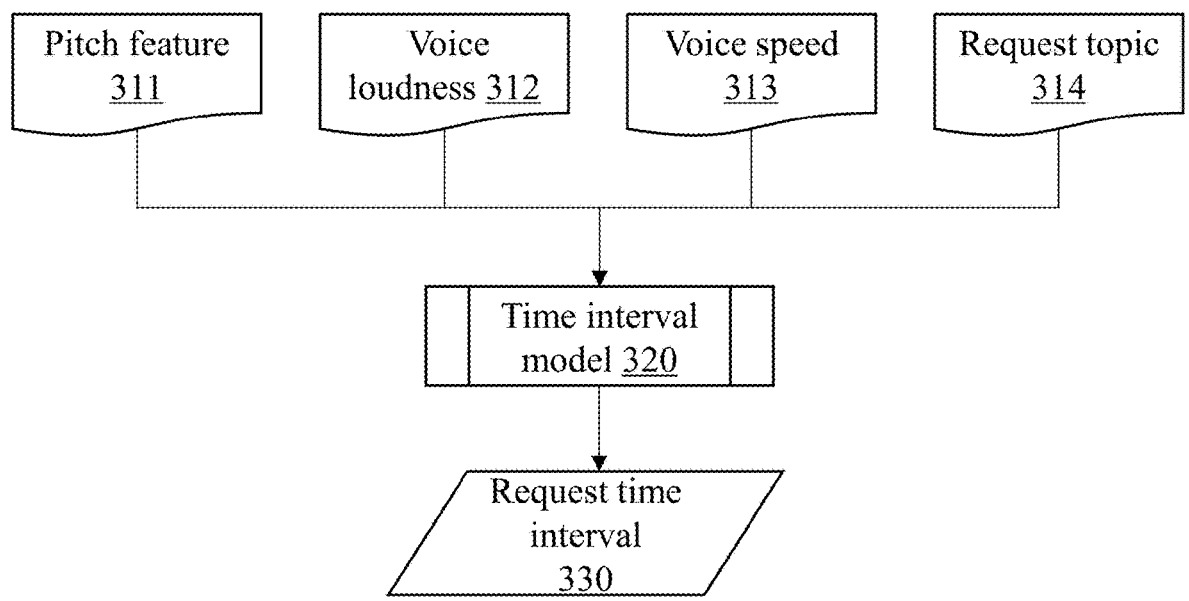
FIG. 3 is a schematic diagram illustrating a method for determining a request time interval according to some embodiments of the present disclosure.

FIG. 3 is a schematic diagram illustrating a method for determining a request time interval according to some embodiments of the present disclosure.

In some embodiments, as shown in FIG. 3, the demand response time parsing module 220 is further configured to evaluate a request time interval 330 based on a pitch feature 311, a voice loudness 312, a voice speed 313, and a request topic 314 via a time interval model 320.

For more detailed descriptions of the pitch feature, the voice loudness, the voice speed, the request topic, and the request time interval, please refer to FIG. 2 and related descriptions.

The time interval model 320 is a model for evaluating a request time interval corresponding to a voice request question of a current user. In some embodiments, the time interval model 320 is a machine learning model. For example, the time interval model 320 is at least one of a Recurrent Neural Networks (RNN) model, a Neural Networks (NN) model, a Deep Neural Networks (DNN) model, or other models.

In some embodiments, the time interval model 320 includes a feature determination layer and a time determination layer.

The feature determination layer is a model for determining a user own feature. In some embodiments, the feature determination layer is a machine learning model. For example, the feature determination layer is an RNN model, or the like. Inputs of the feature determination layer include the voice speed, the pitch feature, and the voice loudness, and an output of the feature determination layer includes the user own feature.

The time determination layer is a model for determining the request time interval. In some embodiments, the feature determination layer is a machine learning model. For example, the feature determination layer is an NN model, etc. Inputs of the time determination layer include the user own feature, the pitch feature, the request topic, and a candidate time interval, and an output of the feature determination layer includes a matching degree of the candidate time interval. The second processor 120-1 may select a candidate time interval with the largest matching degree as the request time interval.

In some embodiments, the second processor 120-1 determines the candidate time interval based on historical data. For example, the second processor 120-1 selects a historical demand response timestamp of similar historical data as a target timestamp from the historical data, and performs a preset adjustment on the target timestamp to obtain at least one candidate time interval. The similar historical data is historical data that is similar to the user own feature, the pitch feature, and the request topic as input to the time interval model 320 for which a historical demand response timestamp exists. The preset adjustment may include increasing and/or decreasing the target timestamp. For example, the preset adjustment includes decreasing 1 minute, increasing 30 seconds, etc. The matching degree is a degree to which the candidate time interval matches an actual response time in a management system subsequently. For example, the matching degree is expressed as a value in a range of 0 to 1. For a manner for determining the matching degree, please refer to the descriptions below.

In some embodiments, the time interval model 320 is obtained based on supervised learning by training the feature determination layer and the time determination layer, respectively.

In some embodiments, the feature determination layer is obtained by training a large number of first training samples and first labels corresponding to the first training samples. In some embodiments, a plurality of first training samples with a first label are input into an initial feature determination layer, a loss function is constructed from the first label and a result of the initial feature determination layer, and based on the loss function, the initial feature determination layer is iteratively updated via gradient descent or other manners to iteratively update parameters of the initial feature determination layer. A model training is completed when a preset training condition is satisfied, and a trained feature determination layer is obtained. The preset training condition may be that the loss function converges, a count of iterations reaches a threshold, or the like.

Each training sample in the first training samples may include a sample voice speed, a sample pitch feature, and a sample voice loudness in sample data. The first training sample may be obtained from the historical data. The first label corresponding to the first training sample is a sample user own feature corresponding to each set of training samples. The first label may be obtained by manual labeling or automatic labeling. For example, the first label determines the sample user own feature based on the first training sample by looking up a user feature table. For more detailed descriptions of the user feature table, please refer to FIG. 5 and related descriptions.

As another example, the second processor 120-1 recognizes, based on an interaction screen, a click feature of a user corresponding to the first training sample while waiting for a response, and determines a degree value of impatience and a degree value of good and bad temper as the first label. The click feature is a feature of the user clicking on a screen of the interaction screen. The click feature may include a count of clicks and an amount of force with which an expedite button, a rush button, etc., is clicked. The degree value of impatience is positively correlated with the count of clicks and the amount of force, and the degree value of good temper is negatively correlated with the count of clicks and the amount of force.

In some embodiments, the time determination layer is obtained by training with a large number of second training samples and second labels corresponding to the second training samples. A specific training manner is similar to one for the feature determination layer, and can be referred to the previous related descriptions.

Each set of training samples in the second training samples may include a sample user own feature, a sample pitch feature, a sample request topic, and a candidate time interval in the sample data. The second training sample may be obtained from the historical data. The second label corresponding to the second training sample is a sample matching degree of a candidate time interval corresponding to each set of training samples.

In some embodiments, the matching degree is determined based on user feedback in the historical data or simulated data. For example, there is a historical demand response timestamp in a same type of historical voice request question of the user, a response time corresponding to the historical demand response timestamp is 10 minutes. For an adaptive response content given at a candidate time interval of 10 minutes, corresponding user feedback is mostly unfavorable (e.g., a score of 0-2). For an adaptive response content given before a candidate time interval of 8 minutes, corresponding user feedback is mostly favorable (3-5 points). Then a label corresponding to the candidate time interval of 10 minutes is labeled as 0.6 to 1, and a label corresponding the candidate time interval of 8 minutes is labeled as 0 to 0.6. The exact size of the label is determined based on a user rating and a count of favorable reviews. The higher the user rating and the higher the count of favorable reviews, the better the matching degree.

In some embodiments, a training process of the time determination layer includes training based on a training dataset. The training dataset includes a second training sample and a third training sample, the third training sample being a sample with a third label.

The training dataset is a dataset used to train the time determination layer. For more information about the second training sample, please refer to FIG. 3 and the related descriptions.

The third training sample includes a simulated user own feature, a simulated pitch feature, a simulated request topic, and a candidate time interval in a simulated training sample. The third label is a simulated matching degree corresponding to the third training sample.

In some embodiments, the second processor 120-1 is configured to: in response to a count of second training samples with a second label being less than a preset threshold, generate a simulated training sample by simulating, input the simulated training sample into the time determination layer, and determine a simulated training sample whose confidence degree is greater than a preset confidence degree threshold among output results of the time determination layer as the third training sample, and an output result corresponding to the third training sample is determined as the third label. The output result of the time determination layer includes a candidate time interval with the largest matching degree, and more detailed information can be referred to the above descriptions.

In some embodiments, the second processor 120-1 randomly generates a plurality of simulated training samples based on an upper value and a lower limit value of input data. The input data includes the user own feature, the pitch feature, the request topic, and the candidate time interval.

The confidence degree reflects a confidence degree of an output result obtained by the time determination layer based on the simulated training sample. The confidence degree may be related to a difference between the output result and an actual request time interval. The actual request time interval may be obtained by querying a time table. The preset confidence degree threshold may be preset empirically. For more detailed descriptions of the time table, please refer to FIG. 2 and the related descriptions.

In some embodiments, a training process of the time determination layer includes training based on the second training sample with the second label, and then training based on the third training sample with the third label, so to obtain the time determination layer. A specific training process may be referred to the preceding training process of the feature determination layer.

In some embodiments, in response to a count of the second training samples with a second label being greater than or equal to the preset threshold, the second processor 120-1 directly obtains the time determination layer based on the second training samples with a second label through training.

In the training process of the time determination layer, if manually-labeled second training samples are insufficient, a count of training samples of the time determination layer may be increased by random simulation, which leads to better robustness and stability of the time determination layer obtained through training.

FIG. 4 is a flowchart illustrating a process for counting a percentage of each pitch type according to some embodiments of the present disclosure.

In some embodiments, a pitch feature includes a percentage and a pitch undulation of each pitch type.

The percentage is an occurrence ratio of a same pitch type. The pitch undulation is used to reflect a change of pitch in a voice request question.

A process 400 is a process for counting the percentage of each pitch type. As shown in FIG. 4, the process 400 includes steps 410 to 440. In some embodiments, the dialogue scene recognition module 240 is further configured to perform steps 410 to 440. The dialogue scene recognition module 240 is integrated into the first processor 110-2 or the second processor 120-1. The later descriptions are illustrated as the second processor 120-1 as an example.

Step 410, obtaining a voice corresponding to at least one segmented word by disassembling a voice request question input by a user based on at least one segmented word obtained through segmenting a request question text message.

The segmented word corresponds to a voice one by one. For example, the request question text message corresponds to six segmented words, and the second processor 120-1 disassembles the voice request question according to the six segmented words to obtain voices corresponding to the six segmented words.

Step 420, obtaining a pronunciation frequency corresponding to the at least one segmented word based on the voice corresponding to the at least one segmented word.

The pronunciation frequency may be a sound frequency of the voice corresponding to the at least one segmented word.

In some embodiments, for one segmented word, the second processor 120-1 obtains, based on the voice receiving device 110-1, the sound frequency of the voice corresponding to the segmented word, and uses a statistical value of the sound frequency as the pronunciation frequency. The statistical value of the sound frequency may be an average or a range of sound frequencies.

Step 430, matching the pronunciation frequency corresponding to the at least one segmented word with pronunciation frequency ranges corresponding to each pitch type in a management information base to obtain a pitch type corresponding to the at least one segmented word.

In some embodiments, the pitch type includes a high pitch or a low pitch, etc. For more detailed descriptions of the pitch type, please refer to FIG. 2.

In some embodiments, for one segmented word, the second processor 120-1 designates a historical pitch type corresponding to a pronunciation frequency range in which a pronunciation frequency of the segmented word is located, as the pitch type of the segmented word.

Step 440, comparing the pitch type corresponding to the at least one segmented word and categorizing segmented words corresponding to a same pitch type and counting the percentage of the each pitch type.

In some embodiments, for a particular pitch type, the second processor 120-1 designates a ratio of a count of segmented words corresponding to the pitch type to a total count of segmented words as a percentage of the pitch type.

For a more detailed description of steps 410 to 440, please refer to a percentage of each pitch type and a manner for determining a percentage of each pitch type illustrated in later embodiments.

In some embodiments, the dialogue scene recognition module 240 is further configured to sort the at least one segmented word in an appearance order in the request question text message to obtain at least one segmentation number; construct a two-dimensional coordinate system using the at least one segmentation number of the at least one segmented word as a horizontal axis and the pronunciation frequency corresponding to the at least one segmented word as a vertical axis and label a plurality of points in the two-dimensional coordinate system for the pronunciation frequency corresponding to each segmented word to form a variation curve of pronunciation frequency; obtain a tangent slope of each of the plurality of points in the variation curve of pronunciation frequency, respectively, and introduce the tangent slope of each of the plurality of points into a formula (9). For more detailed descriptions of the formula (9), please refer to the associated embodiments below.

The segmentation number is a serial number of the appearance of a segmented word in the request question text message. A segmentation number of a first-appeared segmented word may be 1.

FIG. 5 is a schematic diagram illustrating a variation curve of pronunciation frequency according to some embodiments of the present disclosure.

The variation curve of pronunciation frequency is a curve that responds to changes in sound frequency in response to an order in which the segmented word appears. For example, as shown in FIG. 5, the second processor 120-1 constructs a two-dimensional coordinate system using segmentation number of segmented words as a horizontal axis and pronunciation frequencies corresponding to the segmented words as a vertical axis, and designates a pronunciation frequency corresponding to each segmented word as a point, labels a plurality of points and connects the plurality of points to form the variation curve of pronunciation frequency.

A tangent slope reflects a change rate of a pronunciation frequency at a given moment.

In some embodiments, the second processor 120-1 determines a pitch undulation based on a count of points, tangent slopes of each of the points, and the segmentation numbers. One segmented word corresponds to at least one point. For example, the second processor 120-1 calculates the pitch undulation using a formula (9). For more detailed descriptions of the formula (9), please refer to the associated embodiments below.

The intonation undulation may also convey an emotional state of a speaker to some extent, wherein larger undulation usually shows strong emotions, while flatter intonation may express a relatively calm or neutral emotional state. The pitch undulation allows for a more realistic dialogue scene to be determined subsequently, thus increasing user satisfaction.

In some embodiments, the dialogue scene recognition module 240 is further configured to: compare a percentage of each pitch type to extract a maximum percentage and a minimum percentage, and introduce the maximum percentage and the minimum percentage into a formula (10) to calculate a percentage differentiation degree of the each pitch type; compare the percentage differentiation degree of the each pitch type with a preconfigured effective percentage differentiation degree, and in response to the percentage differentiation degree of the each pitch type being greater than or equal to the effective percentage differentiation degree, select a pitch type with a maximum percentage among the each pitch type as an inclined pitch, and in response to the percentage differentiation degree corresponding to the each pitch type being less than the effective percentage differentiation degree, compare the pitch undulation of the each pitch type with a limited pitch undulation, and in response to the pitch undulation of the each pitch type being greater than the limited pitch undulation, determine a high pitch as the inclined pitch, and in response to the pitch undulation being less than or equal to the limited pitch undulation, determine a low pitch as the inclined pitch, and match the inclined pitch with dialogue scenes corresponding to the each pitch type in a management information base to obtain a dialogue scene corresponding to a voice request question. For more detailed descriptions of the formula (10), please refer to the associated embodiments below.

The percentage differentiation degree reflects a difference between percentages of different pitch types. In some embodiments, the second processor 120-1 determines the percentage differentiation degree based on the maximum percentage and the minimum percentage in a plurality of manners. For example, the second processor 120-1 designates a difference between the maximum percentage and the minimum percentage as the percentage differentiation degree. As another example, the second processor 120-1 calculates the percentage differentiation degree using the formula (10).

The effective percentage differentiation degree is a preset reference value of the percentage differentiation degree.

The inclined pitch is a biased pitch type of the voice request question. For example, the inclined pitch is either the high pitch or the low pitch.

The limited pitch undulation is a threshold used to determine whether the inclined pitch is the high pitch or the low pitch.

In some embodiments, the second processor 120-1 selects a dialogue scene corresponding to a pitch type that has the greatest similarity with the inclined pitch in the management information base as the dialogue scene corresponding to the voice request question.

For more detailed descriptions of the above contents, please refer to the associated embodiments below.

Determining the inclined pitch based on the percentage differentiation degree, and thus selecting the dialogue scene corresponding to the inclined pitch can make the dialogue scene more in line with a pitch habit of the user, thus improving the user experience.

Associated embodiments are illustrated below.

It should be noted that a term "request question" described in the following is equivalent to a term "voice request question" used in FIGS. 1 to 5 and the related descriptions. In the contents of the management information base described in the following section, "pronunciation frequency ranges and dialogue scenes corresponding to each type of pitch" is equivalent to "pronunciation frequency ranges and dialogue scenes corresponding to each pitch type" in the preceding section. "sorted searched results" is equivalent to "searched results and sorting numbers corresponding to the searched results", "serial number of segmented word" is equivalent to "segmentation number", "an order before and after" is equivalent to "appearance order", and "determining a dialogue intonation that is consistent as an appropriate dialogue intonation" is equivalent to "determining an appropriate dialogue intonation corresponding to a dialogue scene which is consistent with the dialogue scene corresponding to the voice request question as the adaptive dialogue intonation corresponding to the voice request question" in the preceding text.

The present disclosure proposes an intelligent management system for a digital person dialogue based on Internet of Things (IoT), comprising: a voice request question extraction module, a demand response time parsing module, an adaptive response content search and determination module, a dialogue scene recognition module, an adaptive dialogue intonation selection module, an adaptive dialogue language selection module, a management information base, and a dialogue expression and implementation module.

The voice request question extraction module is connected to the demand response time parsing module, the dialogue scene recognition module, and the adaptive dialogue intonation selection module, respectively. The demand response time parsing module is connected to the adaptive response content search and determination module. The dialogue scene recognition module is connected to the adaptive dialogue intonation selection module. The adaptive response content search and determination module, the adaptive dialogue intonation selection module, and the adaptive dialogue language selection module are all connected to the dialogue expression and implementation module. The management information base is connected to the demand response time parsing module, the dialogue scene recognition module, and the adaptive dialogue intonation selection module, respectively.

A connection relationship between modules may be referred to FIG. 2.

The voice request question extraction module is configured to extract a voice request question currently entered by a user from a dialogue platform and obtain an input time point of the request question.

The demand response time parsing module is configured to analyze a request urgency coefficient of the user based on the voice request question input by the user, and thereby parsing a demand response time for the request question.

As the above-preferred embodiment, the request urgency coefficient of the user can be referred to a following analysis process: obtaining a request question text message by performing a textual recognition on the voice request question input by the user.

Segmenting the request question text message to obtain at least one segmented word, and recognize a request topic of the voice request question based on the at least segmented word.

Segmenting the request question text message is a process of cutting continuous text into words or sub-words, which is a basic task in natural language processing. A goal of segmenting is to divide a sentence into meaningful words to provide a basis for subsequent text analysis and understanding.

Applied to the above embodiments, recognizing the request topic from the at least one segmented word may be done using word frequency statistics and keyword extraction manner, specifically by counting an occurrence frequency of each word in a text to obtain a word frequency statistics table, and then using a keyword extraction algorithm, such as Term Frequency-Inverse Document Frequency (TF-IDF) or TextRank to identify words that have a higher weight in the text. These keywords represent the request topic.

Obtaining a topic urgency index corresponding to the voice request question by matching a recognized request topic with topic urgency indexes corresponding to a plurality of request topics in the management information base.

It is important to understand that analyzing a request urgency of the user takes into account the fact that some topics may be inherently urgent, e.g., topics such as health issues, urgent requests for help, or the like.

The at least one segmented word obtained through segmenting the request question text message is matched with a vocabulary set describing urgency in the management information base using a formula (3):

$$\text{urgency matching degree} = \frac{\text{count of successfully} - \text{matched segmented words}}{\text{total count of segmented words}} \quad (3)$$

Calculating an urgency matching degree corresponding to the request question, where the greater the count of successfully-matched segmented words, the greater the urgency matching degree.

In specific examples, words describing urgency are such as "urgent", "immediate", "in urgent need of help", etc.

Recognizing whether a demand response timestamp exists in the at least one segmented word obtained through segmenting the request question text message, in response to the demand response timestamp existing, comparing the demand response timestamp with the input time point of the request question, calculating a time sensitivity corresponding to the request question using a formula. For example, the time sensitivity is calculated using a formula (4), which is represented as below:

$$\text{time sensitivity} = \left(\frac{1}{e-1}\right)^{\left(\frac{\text{demand response timestamp} - \text{input time point of request question}}{\text{reference duration}}\right)} \quad (4)$$

Where the closer the demand response timestamp is to the input time point of the request question, the higher the time sensitivity.

Applied to the above embodiment, when a request question text message is "I need to receive an instruction on how to use a product by 4:30", the presence of 4:30 in the request question indicates that a demand response timestamp exists.

It should be noted that when analyzing the request urgency of the user, a correlation between the request question of the user and a time is taken into account, and when the user explicitly mentions the demand response time in the request question, it indicates that the request question needs to be solved in a timely manner and a dialogue is highly urgent.

Introducing the topic urgency index, the urgency matching degree, and the time sensitivity corresponding to the request question into an analysis model. For example, the analysis model is represented by a formula (5):

$$Q = \frac{2\alpha * TI + 2\alpha * ED + 6\alpha * TS}{\sqrt{1 + 3(2\alpha * TI + 2\alpha * ED + 6\alpha * TS)^2}} \quad (5)$$

The request urgency coefficient Q of the user is obtained using the formula (5), where TI, ED, and TS represent the topic urgency index, the urgency matching degree, and the time sensitivity corresponding to the voice request question, respectively, and a represents a preset weight factor, and $\alpha$ may be 0.1.

The present disclosure analyzes the request question urgency based on the voice request question input by the user from three dimensions including a topic, vocabulary, and time sensitivity of the request question. This manner avoids the one-sidedness and limitations of single-dimensional analysis, maximizing the accuracy of the analysis result and providing a reliable reference for parsing the demand response time for the request question.

As a further embodiment of the above-preferred embodiment, a specific parsing process of the demand response time for the request question is as follows: determine the demand response time for the voice request question based on the request urgency coefficient of the user and the demand response time corresponding to conventional request urgency coefficient in the management information base using a parsing algorithm. For example, the paring algorithm is represented by a formula (6):

$$T = \begin{cases} T_0 * \left(1 - \frac{Q - Q_0}{1 + |Q - Q_0|}\right), & Q > Q_0 \\ T_0, & Q \leq Q_0 \end{cases} \quad (6)$$

Where T represents the demand response time corresponding to the request question, $T_0$ represents the response demand time corresponding to the conventional request urgency coefficient, and $Q_0$ represents the conventional request urgency coefficient. More information about Q can be referred to the formula (5) and the related descriptions.

The adaptive response content search and determination module is configured to search and determine an adaptive response content corresponding to the request question from a response knowledge base based on the voice request question input by the user and the demand response time, and a specific realization process is as follows: searching in the response knowledge base based on the request question text message using a built-in search algorithm in the system to obtain sorted searched results arranged in descending order based on relevance degrees corresponding to the sorted searched results.

An occupied space corresponding to each of the searched results are obtained.

Detecting a communication network transmission speed of a current dialogue platform and predicting a demand transmission time corresponding to each of the searched results based on the communication network transmission speed and the occupied space corresponding to each of the searched results, where the demand transmission time is obtained using a formula (7):

$$\text{demand transmission time} = \frac{\text{occupied space}}{\text{communication network transmission speed}} \quad (7)$$

Comparing the demand response time for the voice request question with the demand transmission time corresponding to each of the searched results, and select at least one searched result whose demand transmission time is less than or equal to the demand response time as at least one alternative searched result.

Extracting a sorting number corresponding to the at least one alternative searched result from the sorted searched results and evaluating a selection value degree corresponding to the at least one alternative searched result based on the sorting number corresponding to the at least one alternative searched result and a demand transmission time corresponding to the at least one alternative searched result, and a specific evaluation formula is represented by a formula (8):

$$\text{selection value degree} = \log_{(sorting\ number+1)}\left[3^{\left(\frac{demand\ response\ time - demand\ transmission\ time}{demand\ response\ time}\right)} + 1\right] \quad (8)$$

Where the smaller the sorting number of the alternative searched result, the higher the ranking of the alternative searched result, and it is indicated that the alternative searched result has a greater relevance degree to the request question.

Sorting alternative searched results in descending order according to the selection value degree corresponding to each of the alternative searched results, and a first-ranked alternative searched result is selected as the adaptive response content corresponding to the voice request question.

The present disclosure analyzes the request urgency and searches for the response content based on the voice request question input by the user, and parses the demand response time for the request question based on the request urgency coefficient of the request question, and predicts a transmission time of a searched result by detecting a communication network transmission speed corresponding to a current dialogue platform. At the same time, the demand response time and the demand transmission time are combined to realize the adaptive selection of the response content of the request question, which is conducive to guaranteeing the effective selection of the response content, greatly avoiding the problem of untimely delivery of the response content, thereby meeting a response need of the user in a targeted manner and improves the response experience of the user to a certain extent.

As a further improvement of the above technical solution, before searching from the response knowledge base to determine the adaptive response content corresponding to the request question, the request question text information is compared in terms of similarity with request questions in historical dialogue records, and a request question similarity corresponding to each of the historical dialogue records is obtained. Then a historical dialogue record with a maximum request question similarity is selected as a reference dialogue record.

In optional embodiments, comparing the request question text message in terms of similarity with the request questions in the historical dialogue records may be performed by using an overlap comparison: counting a count of overlapping segmented words between the request questions in the historical dialogue records and the request question text message, and dividing the count of overlapping segmented words of the historical dialogue records by a total count of segmented words obtained by segmenting the request question text message to obtain the request question similarity corresponding to each of the historical dialogue records. Particularly, the overlapping segmented words include not only the overlapping between segmented words overlapping but also the overlapping between similar words of the segmented words.

Extracting a response content from the reference dialogue record, and the response content is designated as the adaptive response content corresponding to the request question.

The present disclosure also takes into account the historical dialogue records while selecting the adaptive response content corresponding to the request question, and when a same request question exists in the historical dialogue records, by extracting the response content in the historical dialogue record to perform a current dialogue, it can greatly improve a response speed of the response, and also reduce the unnecessary operation of the search engine, which is conducive to saving search resources.

The dialogue scene recognition module is used to extract a pitch feature from the voice request question input by the user. The pitch feature includes a percentage and a pitch undulation of each pitch type, thereby recognizing a dialogue scene corresponding to the voice request question.

As an embodiment of the present disclosure, a process of extracting the percentage of the each pitch type is as follows: obtaining a voice corresponding to the at least one segmented word by disassembling the voice request question input by the user based on the at least one segmented word obtained through segmenting the request question text message.

Obtaining a pronunciation frequency corresponding to the at least one segmented word based on the voice corresponding to the at least one segmented word.

Matching the pronunciation frequency corresponding to the at least one segmented word with pronunciation frequency ranges corresponding to each type of pitch in the management information base to obtain a pitch type corresponding to the at least one segmented word, the pitch type including a high pitch and a low pitch.

It is important to understand that variations in high and low pitch may convey an emotional state of a speaker, e.g. a high pitch is usually associated with excitement, whereas a low pitch may be associated with calmness and composure.

Comparing the pitch type corresponding to the at least one segmented word and categorizing segmented words corresponding to a same pitch type and counting the percentage of the each pitch type, specifically a percentage of the high pitch and a percentage of the low pitch.

As a further embodiment of the present disclosure, a process of extracting the pitch undulation is as follows: sorting the at least one segmented word in an order before and after the request question text message to obtain at least one segmentation number.

Constructing a two-dimensional coordinate system using serial numbers of segmented words as a horizontal axis and a pronunciation frequency corresponding to the at least one segmented word as a vertical axis and labeling a plurality of points in the two-dimensional coordinate system for a pronunciation frequency corresponding to each segmented word to form a variation curve of pronunciation frequency, as shown in FIG. 5.

Obtaining a tangent slope of each of the plurality of points in the variation curve of pronunciation frequency, respectively, and introducing the tangent slope of each of the plurality of points into a formula to calculate the pitch undulation $\eta$, and a formula to calculate the pitch undulation is represented by a formula (9):

$$\eta = \frac{e^{\frac{1}{n}\sum_{i=1}^{n}|k_i|} - e^{-\frac{1}{n}\sum_{i=1}^{n}|k_i|}}{e^{\frac{1}{n}\sum_{i=1}^{n}|k_i|} + e^{-\frac{1}{n}\sum_{i=1}^{n}|k_i|}} \quad (9)$$

Where η represents the pitch undulation, the $k_i$ represents a tangent slope of a point i in the variation curve of pronunciation frequency, i represents a point number in the variation curve of pronunciation frequency, i=1, 2, . . . , n, n represents a count of points in the variation curve of pronunciation frequency, and e represents a natural constant, where the larger the absolute value of the tangent slope of the point in the variation curve of pronunciation frequency, the larger the pitch undulation.

Again, it is important to understand that intonation undulation can also convey the emotional state of the speaker to some extent, where larger undulation usually expresses strong emotions, while flatter intonation may express a relatively calm or neutral emotional state.

Applied to the above-preferred implementation, a process of recognizing the dialogue scene corresponding to the voice request question is as follows: comparing the percentage of the each pitch type to extract a maximum percentage and a minimum percentage, and introducing the maximum percentage and the minimum percentage into a formula (10) to obtain a percentage differentiation degree. A process of obtaining the percentage differentiation degree is represented by a formula (10):

$$\text{percentage differentiation degree} = \frac{\text{maximum percentage} - \text{minimum percentage}}{\sqrt{1 + 2(\text{maximum percentage} - \text{minimum percentage})^2}} \quad (10)$$

Calculating the percentage differentiation degree corresponding to each pitch type, where the larger the difference between the maximum percentage and the minimum percentage, the larger the percentage differentiation degree corresponding to the pitch type.

Comparing the percentage differentiation degree corresponding to the pitch type with a preconfigured effective percentage differentiation degree, for example, the effective percentage differentiation degree may be set to 0.9, in response to the percentage differentiation degree corresponding to the pitch type being greater than or equal to the effective percentage differentiation degree, it indicates that a difference between the maximum percentage and the minimum percentage is larger, and a pitch type corresponding to the maximum percentage has an obvious advantage, then the pitch type corresponding to the maximum percentage is selected as the inclined pitch from the each pitch type. On the contrary, in response to the percentage differentiation degree corresponding to the pitch type being less the effective percentage differentiation degree, it indicates that the difference between the maximum percentage and the minimum percentage is smaller, and there is no obvious difference between the percentage of the high pitch and a percentage of the low pitch, so at this time, using the percentage corresponding to the pitch type for the analysis of the inclined pitch is obviously not informative. Therefore, the pitch undulation is compared with a limited pitch undulation. For example, the limited pitch undulation may be set to 0.85, and in response to the pitch undulation being greater than the limited pitch undulation, the high pitch is designated as the inclined pitch, and in response to the pitch undulation being less than or equal to the limited pitch undulation, the low pitch is designated as the inclined pitch.

Matching the inclined pitch with dialogue scenes corresponding to each type of pitch in the management information base, and selecting the dialogue scene corresponding to the voice request question from the dialogue scenes. For example, the dialogue scene is either light-hearted and cheerful or serious and solemn.

The adaptive dialogue intonation selection module is configured to select an adaptive dialogue intonation based on the dialogue scene corresponding to the voice request question, and a specific selection manner is as follows: compare the dialogue scene corresponding to the voice request question with a plurality of dialogue scenes in the management information base and determine an appropriate dialogue intonation that is consistent as the adaptive dialogue intonation.

For example, when the dialogue scene is light and cheerful, the adaptive dialogue intonation is a friendly and cordial intonation, and when the dialogue scene is serious and solemn, the adaptive dialogue intonation is a serious and focused intonation.

The management information base is configured to store topic urgency indexes corresponding to a plurality of request topics, a vocabulary set describing urgency, a demand response time corresponding to a conventional request urgency coefficient, pronunciation frequency ranges, and dialogue scenes corresponding to a plurality of types of pitches, and appropriate dialogue intonations corresponding to a plurality of dialogue scenes.

The adaptive dialogue language selection module is configured to recognize a language type from the voice request question input by the user as an adaptive dialogue voice type. For example, the language type is a mandarin, a local dialect, or the like.

The dialogue expression and implementation module is configured to transmit the adaptive response content, the adaptive dialogue intonation, and the adaptive dialogue voice type of the voice request question to a control terminal, then the control terminal controls a digital person to perform a dialogue expression about the adaptive response content on the dialogue platform in accordance with the adaptive dialogue intonation and the adaptive dialogue voice type.

The present disclosure recognizes the pitch feature and the language type from the voice request question input by the user, selects the adaptive dialogue intonation and the adaptive language type accordingly, and then when the digital person performs the dialogue expression about the adaptive response content corresponding to the request question in accordance with the adaptive dialogue intonation and the adaptive language type, this realizes the effective attention to a voice expression of the response content of the digital person, makes a dialogue of the digital person more natural and vivid, and to a certain extent draws the distance between the digital person and the user closer, so that the conviction degree of the response content for the user is improved to a certain extent, which is helpful for improving the effect of the dialogue.

The foregoing is merely an example and description of the idea of the present disclosure, and the technical personnel belonging to the technical field make various modifications or additions to the specific embodiments described or adopt similar ways of substitution, as long as they do not depart from the idea of the disclosure or exceed the scope defined herein. As long as they do not deviate from the idea of the disclosure or exceed the scope defined in the disclosure, they shall fall within the scope of protection of the disclosure.

Some embodiments use numbers to describe the number of components, attributes, and it should be understood that such numbers used in the description of the embodiments are modified in some examples by the modifiers "about", "approximately", or "substantially". Unless otherwise noted, the terms "about", "approximately", or "substantially" indicates that a ±20% variation in the stated number is allowed. Correspondingly, in some embodiments, the numerical parameters used in the disclosure are approximations, which can be varied depending on the ideal feature of the individual embodiment. In some embodiments, the numerical parameters should take into account the specified number of valid digits and employ general place-keeping. While the numerical domains and parameters used to confirm the breadth of their ranges in some embodiments of the present disclosure are approximations, in specific embodiments, such values are set to be as precise as possible within a feasible range.

What is claimed is:

1. An intelligent management system for a digital person dialogue based on Internet of Things (IoT), comprising one or more memory storages and one or more processors implementing:

a voice request question extraction module, configured to extract a voice request question input by a user from a dialogue platform and obtain an input time point of the voice request question;

a demand response time parsing module, configured to analyze a request urgency coefficient of the user based on the voice request question input by the user and determine a demand response time for the voice request question based on the request urgency coefficient;

an adaptive response content search and determination module, configured to search and determine an adaptive response content corresponding to the voice request question from a response knowledge base based on the voice request question input by the user and the demand response time;

a dialogue scene recognition module, configured to extract a pitch feature from the voice request question input by the user and recognize a dialogue scene corresponding to the voice request question based on the pitch feature;

an adaptive dialogue intonation selection module, configured to select an adaptive dialogue intonation based on the dialogue scene corresponding to the voice request question;

a management information base, configured to store topic urgency indexes corresponding to a plurality of request topics, store a vocabulary set describing urgency, store a demand response time corresponding to a conventional request urgency coefficient, and store pronunciation frequency ranges and dialogue scenes corresponding to each pitch type, and store appropriate dialogue intonations corresponding to a plurality of dialogue scenes;

an adaptive dialogue language selection module, configured to recognize a language type from the voice request question input by the user and determine the language type as an adaptive dialogue voice type; and a dialogue expression and implementation module, configured to transmit the adaptive response content, the adaptive dialogue intonation, and the adaptive dialogue voice type of the voice request question to a control terminal, and controls a digital person to perform a dialogue expression about the adaptive response content on the dialogue platform in accordance with the adaptive dialogue intonation and the adaptive dialogue voice type based on the control module;

wherein a process of analyzing the request urgency coefficient of the user based on the voice request question input by the user is as follows:

obtaining a request question text message by performing a textual recognition on the voice request question input by the user;

segmenting the request question text message to obtain a plurality of segmented words, and recognize a request topic of the voice request question based on the plurality of segmented words;

obtaining a topic urgency index corresponding to the voice request question by matching a recognized request topic with the topic urgency indexes corresponding to the plurality of request topics in the management information base;

obtaining a successfully-matched segmented word by matching the plurality of segmented words obtained through segmenting the request question text message with the vocabulary set describing urgency in the management information base, and calculate an urgency matching degree corresponding to the voice request question using a formula:

$$\text{urgency matching degree} = \frac{\text{count of successfully} - \text{matched segmented words}}{\text{total count of segmented words}};$$

recognizing whether a demand response timestamp exists in the plurality of segmented words obtained through segmenting the request question text message, in response to the demand response timestamp existing, comparing the demand response timestamp with the input time point of the voice request question and calculating a time sensitivity corresponding to the voice request question using a formula:

$$\text{time sensitivity} = \left(\frac{1}{e-1}\right)^{\left(\frac{\text{demand response timestamp} - \text{input time point of request question}}{\text{reference duration}}\right)};$$

and determining the request urgency coefficient Q of the user based on the topic urgency index, the urgency matching degree, and the time sensitivity corresponding to the voice request question using an analysis model, the analysis model being represented as $$Q = \frac{2\alpha * TI + 2\alpha * ED + 6\alpha * TS}{\sqrt{1 + 3(2\alpha * TI + 2\alpha * ED + 6\alpha * TS)^2}},$$

where TI, ED, and TS represent the topic urgency index, the urgency matching degree, and the time sensitivity corresponding to the voice request question, respectively, and α represents a preset weight factor, and α=0.1;

wherein a specific process of parsing the demand response time for the voice request question is as follows:

determining the demand response time T for the voice request question based on the request urgency coefficient of the user and the demand response time corresponding to the conventional request urgency coefficient in the management information base using a parsing algorithm:

$$T = \begin{cases} T_0 * \left(1 - \dfrac{Q-Q_0}{1+|Q-Q_0|}\right), & Q > Q_0 \\ T_0, & Q \leq Q_0 \end{cases}$$

where $T_0$ represents the response demand time corresponding to the conventional request urgency coefficient and $Q_0$ represents the conventional request urgency coefficient;
  wherein a process of searching and determining the adaptive response content corresponding to the voice request question from the response knowledge base is as follows:
  searching the request question text message in the response knowledge base using a built-in search algorithm in the system to obtain sorted searched results arranged in ascending order based on relevance degrees corresponding to the sorted searched results;
  obtaining occupied spaces corresponding to the searched results;
  detecting a communication network transmission speed of a current dialogue platform and predicting demand transmission times corresponding to the searched results based on the communication network transmission speed and the occupied spaces corresponding to the searched results;
  comparing the demand response time for the voice request question with the demand transmission times corresponding to the searched results, and selecting at least one searched result whose demand transmission time is less than or equal to the demand response time as at least one alternative searched result;
  selecting a sorting number corresponding to the at least one alternative searched result from the sorted searched results, evaluating a selection value degree corresponding to the at least one alternative searched result based on the sorting number corresponding to the at least one alternative searched result and a demand transmission time corresponding to the at least one alternative searched result using an evaluation formula:

selection value degree =

$$\log_{(sorting\ number+1)}\left[3^{\left(\frac{demand\ response\ time - demand\ transmission\ time}{demand\ response\ time}\right)} + 1\right]$$

and
  sorting alternative searched results in descending order according to the selection value degree corresponding to each of the alternative searched results, and selecting a first-ranked alternative searched result as the adaptive response content corresponding to the voice request question.

2. The intelligent management system for the digital person dialogue based on IoT of claim 1, wherein the pitch feature includes a percentage and a pitch undulation of the each pitch type, and a process of extracting the percentage of the each pitch type is as follows:
  obtaining a voice corresponding to each of the plurality of segmented words by disassembling the voice request question input by the user based on the plurality of segmented words obtained through segmenting the request question text message;
  obtaining a pronunciation frequency corresponding to the each of the plurality of segmented words based on the voice corresponding to the each of the plurality of segmented words;
  matching the pronunciation frequency corresponding to the each of the plurality of segmented words with the pronunciation frequency ranges corresponding to the each pitch type in the management information base to obtain a pitch type corresponding to the each of the plurality of segmented words, the pitch type including at least a high pitch and a low pitch; and
  comparing the pitch type corresponding to the each of the plurality of segmented words and categorize segmented words corresponding to a same pitch type, and counting the percentage of the each pitch type.

3. The intelligent management system for the digital person dialogue based on IoT of claim 2, wherein a process of extracting the pitch undulation is as follows:
  numbering the each of the plurality of segmented words based on an appearance order corresponding to the each of the plurality of segmented words in the request question text message;
  constructing a two-dimensional coordinate system using a serial number corresponding to the each of the plurality of segmented words as a horizontal axis and the pronunciation frequency corresponding to the each of the plurality of segmented words as a vertical axis and labelling a plurality of points in the two-dimensional coordinate system for the pronunciation frequency corresponding to the each of the plurality of segmented word to form a variation curve of pronunciation frequency; and
  obtaining a tangent slope of each of the plurality of points in the variation curve of pronunciation frequency, respectively, and introducing the tangent slope of each of the plurality of points into a formula:

$$\eta = \frac{e^{\frac{1}{n}\sum_{i=1}^{n}|k_i|} - e^{-\frac{1}{n}\sum_{i=1}^{n}|k_i|}}{e^{\frac{1}{n}\sum_{i=1}^{n}|k_i|} + e^{-\frac{1}{n}\sum_{i=1}^{n}|k_i|}}$$

to calculate the pitch undulation $\eta$, where $k_i$ represents a tangent slope of a point i in the variation curve of pronunciation frequency, i represents a point number in the variation curve of pronunciation frequency, i=1, 2, ..., n, n represents a count of points in the variation curve of pronunciation frequency, and e represents a natural constant.

4. The intelligent management system for the digital person dialogue based on IoT of claim 2, wherein a process of recognizing the dialogue scene corresponding to the voice request question is as follows:
  comparing the percentage of the each pitch type to extract a maximum percentage and a minimum percentage, and introducing the maximum percentage and the minimum percentage into a formula:

percentage differentiation degree =

$$\frac{\text{maximum percentage} - \text{minimum percentage}}{\sqrt{1 + 2(\text{maximum percentage} - \text{minimum percentage})^2}},$$

to calculate a percentage differentiation degree of the each pitch type;
  comparing the percentage differentiation degree of the each pitch type with a preconfigured effective percentage differentiation degree, and in response to the percentage differentiation degree of the each pitch type being greater than or equal to the effective percentage differentiation degree, selecting a pitch type with a maximum percentage among the each pitch type as an inclined pitch, and in response to the percentage differentiation degree corresponding to the each pitch type being less than the effective percentage differentiation degree, comparing the pitch undulation of the each pitch type with a set limited pitch undulation; and in response to the pitch undulation of the each pitch type being greater than the set limited pitch undulation, determining the high pitch as the inclined pitch, and in response to the pitch undulation being less than or equal to the set limited pitch undulation, determining the low pitch as the inclined pitch; and matching the inclined pitch with the dialogue scenes corresponding to the each pitch type in the management information base to obtain the dialogue scene corresponding to the voice request question.

5. The intelligent management system for the digital person dialogue based on IoT of claim 1, wherein an implementation manner of selecting the adaptive dialogue intonation is as follows:

comparing the dialogue scene corresponding to the voice request question with the plurality of dialogue scenes in the management information base, and determining an appropriate dialogue intonation corresponding to a dialogue scene in the management information base which is consistent with the dialogue scene corresponding to the voice request question as the adaptive dialogue intonation corresponding to the voice request question.

* * * * *